United States Patent
Mogensen

(10) Patent No.: US 9,448,380 B2
(45) Date of Patent: Sep. 20, 2016

(54) OPTICAL FIBRE GUIDING

(75) Inventor: Uffe G. Mogensen, Vejle Øst (DK)

(73) Assignee: GM Plast A/S, Hedensted (DK)

(*) Notice: Subject to any disclaimer, the term of this patent is extended or adjusted under 35 U.S.C. 154(b) by 431 days.

(21) Appl. No.: 13/376,788

(22) PCT Filed: Sep. 16, 2011

(86) PCT No.: PCT/EP2011/066153
§ 371 (c)(1),
(2), (4) Date: Aug. 16, 2012

(87) PCT Pub. No.: WO2012/035159
PCT Pub. Date: Mar. 22, 2012

(65) Prior Publication Data
US 2012/0315003 A1  Dec. 13, 2012

(30) Foreign Application Priority Data
Sep. 16, 2010 (EP) .................................... 10177169

(51) Int. Cl.
*G02B 6/44* (2006.01)
*H02G 3/04* (2006.01)

(52) U.S. Cl.
CPC .......... *G02B 6/4459* (2013.01); *H02G 3/0406* (2013.01); *G02B 6/4416* (2013.01); *G02B 6/4429* (2013.01); *G02B 6/4434* (2013.01); *G02B 6/4486* (2013.01); *G02B 6/4495* (2013.01)

(58) Field of Classification Search
CPC ...... G02B 6/4401; G02B 6/443; G02B 6/44; G02B 6/4429; G02B 6/4495; G02B 6/4432; G02B 6/4433; G02B 6/4434; G02B 6/4486; G02B 6/4402
USPC ................................ 385/100, 103, 113, 109
See application file for complete search history.

(56) References Cited

U.S. PATENT DOCUMENTS 4,550,976 A    11/1985  Cooper et al.
4,770,489 A *  9/1988  Saito .................... G02B 6/4407
                                                    385/110

(Continued)

FOREIGN PATENT DOCUMENTS

EP    0432171    12/1993
EP    0893722     1/1999

(Continued)

OTHER PUBLICATIONS

International Search Report on related PCT application (PCT/EP2011/066153); International Searching Authority (EPO) dated Feb. 27, 2012.

(Continued)

*Primary Examiner* — Ryan Lepisto
*Assistant Examiner* — Mary A El Shammaa
(74) *Attorney, Agent, or Firm* — Klein, O'Neill & Singh, LLP

(57) ABSTRACT

An assembly for guiding and protecting optical fiber cables or wave guides, which comprises a first number of first guide tubes and a second number of second guide tubes where each of the first and second guide tubes are adapted to receive an optical fiber cable along its complete length. The assembly further comprises an elongated first tubular shell, and an elongated second tubular shell where the first number of first guide tubes is supported within and in parallel relationship with the first tubular shell, and the second number of second guide tubes is supported within and in parallel relationship with the second tubular shell. The assembly further comprises a first connecting strip which interconnects the first and second tubular shells, which defines a separation between the first and second tubular shells, and which positions the first number of first guide tubes and the second number of second guide tubes in parallel. The first and second tubular shells and the first connecting strip originate from a single extrusion process which establishes an interference fitting between the first and second guide tubes and the first and second tubular shells, respectively.

11 Claims, 14 Drawing Sheets

(56) References Cited

U.S. PATENT DOCUMENTS

| | | | | |
|---|---|---|---|---|
| 5,442,722 A | * | 8/1995 | DeCarlo | G02B 6/4404 |
| | | | | 385/114 |
| 5,694,510 A | | 12/1997 | Sano et al. | |
| 6,295,401 B1 | * | 9/2001 | Rutterman | G02B 6/4495 |
| | | | | 385/109 |
| 6,321,013 B1 | * | 11/2001 | Hardwick, III | G02B 6/4411 |
| | | | | 385/109 |
| 6,404,962 B1 | * | 6/2002 | Hardwick, III | G02B 6/4413 |
| | | | | 385/112 |
| 2003/0035635 A1 | | 2/2003 | Chastain et al. | |
| 2003/0133749 A1 | * | 7/2003 | Russell | 404/6 |
| 2003/0165311 A1 | * | 9/2003 | Wagman et al. | 385/113 |
| 2003/0223714 A1 | * | 12/2003 | Conrad et al. | 385/114 |
| 2004/0120666 A1 | * | 6/2004 | Chalk et al. | 385/114 |
| 2004/0223709 A1 | * | 11/2004 | Conrad et al. | 385/114 |
| 2005/0013573 A1 | * | 1/2005 | Lochkovic et al. | 385/128 |
| 2006/0045443 A1 | * | 3/2006 | Blazer | 385/114 |
| 2008/0066947 A1 | * | 3/2008 | Glew | 174/131 A |
| 2009/0297107 A1 | * | 12/2009 | Tatat | 385/114 |

FOREIGN PATENT DOCUMENTS

| | | | |
|---|---|---|---|
| GB | 2017955 | | 10/1979 |
| GB | 2017955 A | * | 10/1979 |
| WO | WO9002286 | | 3/1990 |
| WO | WO2006025812 | | 3/2006 |
| WO | WO2009072750 | | 6/2009 |

OTHER PUBLICATIONS

Written Opinion on related PCT application (PCT/EP2011/066153); International Searching Authority (EPO) dated Feb. 27, 2012.

* cited by examiner

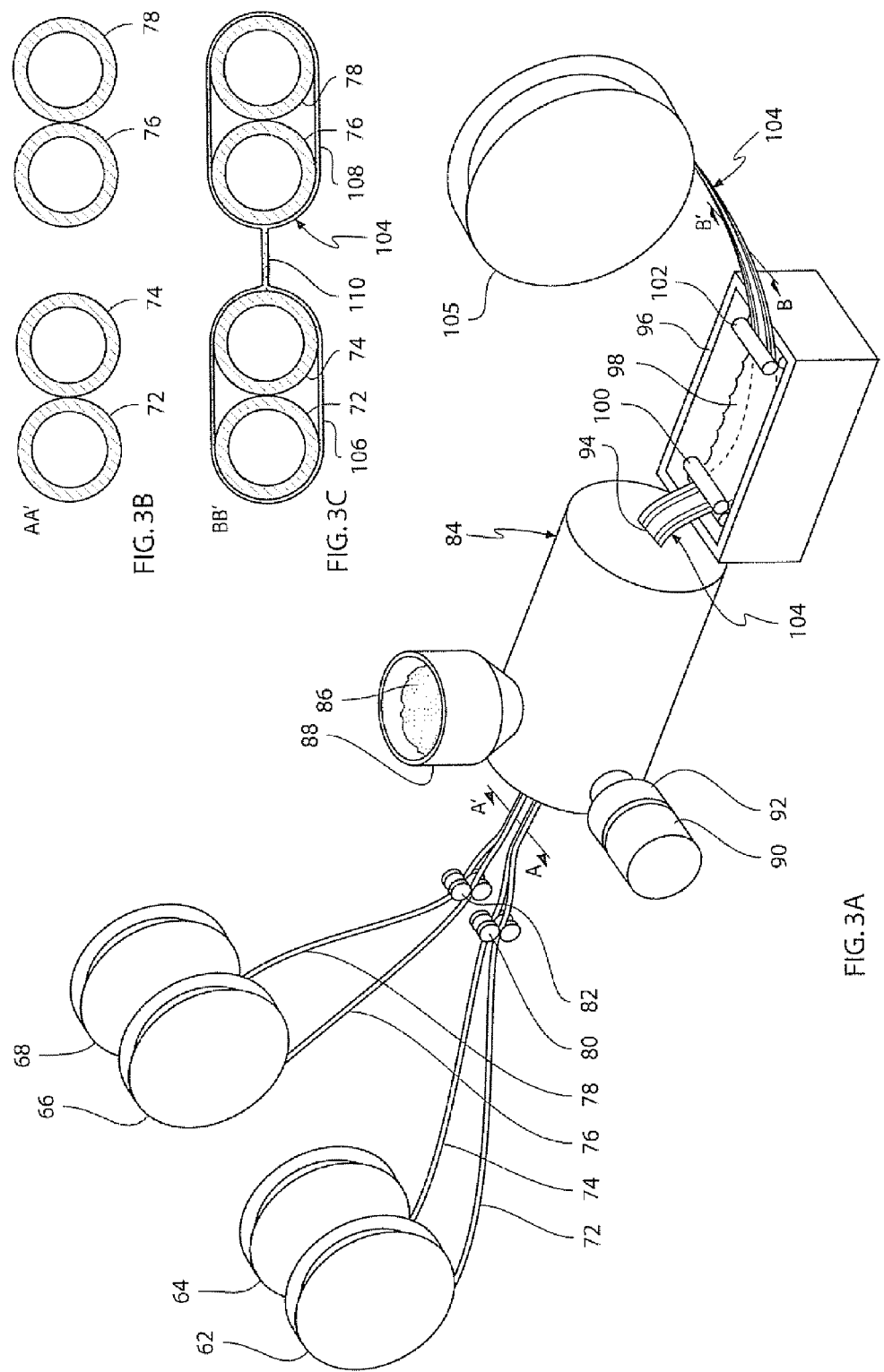

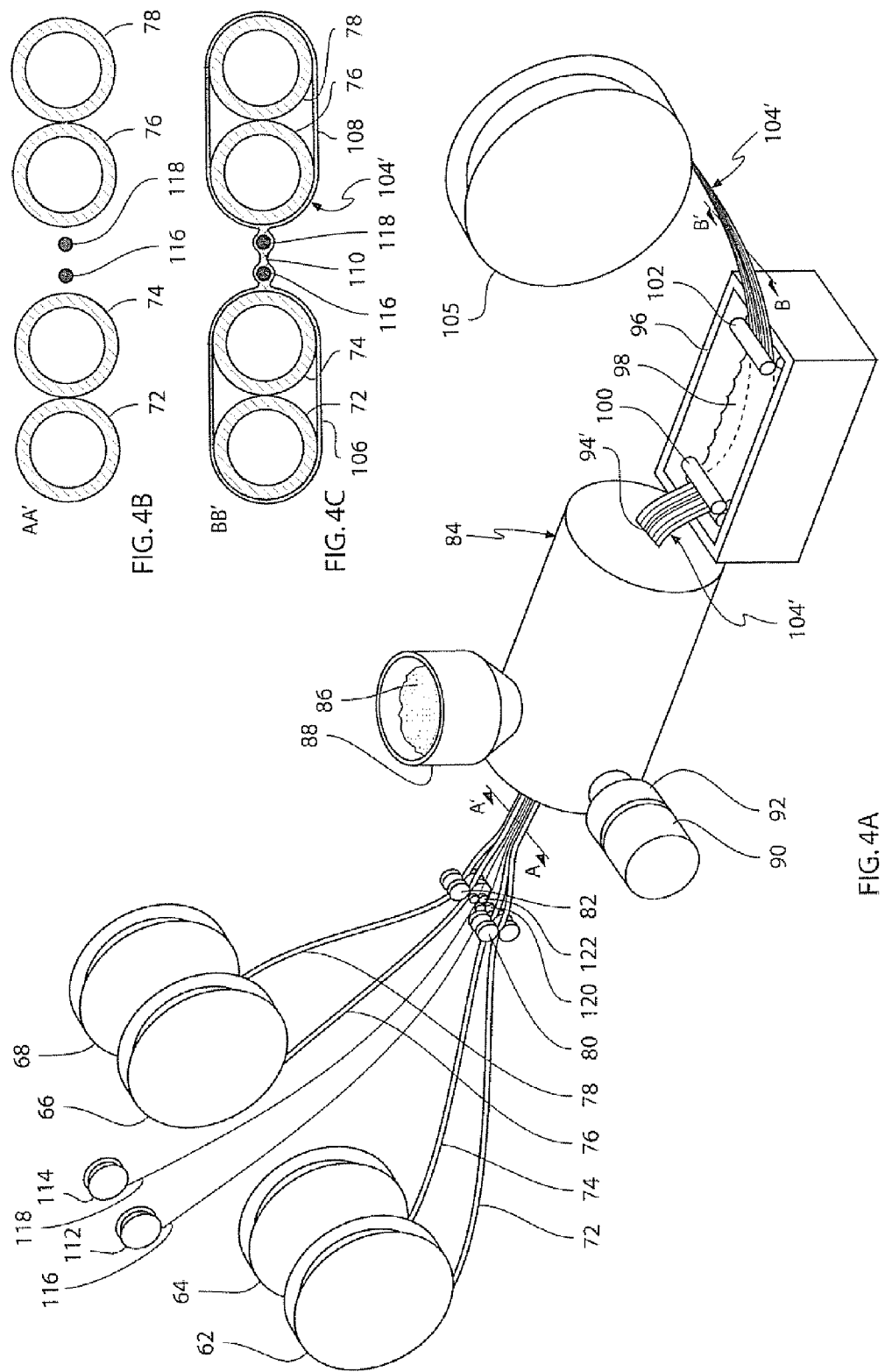

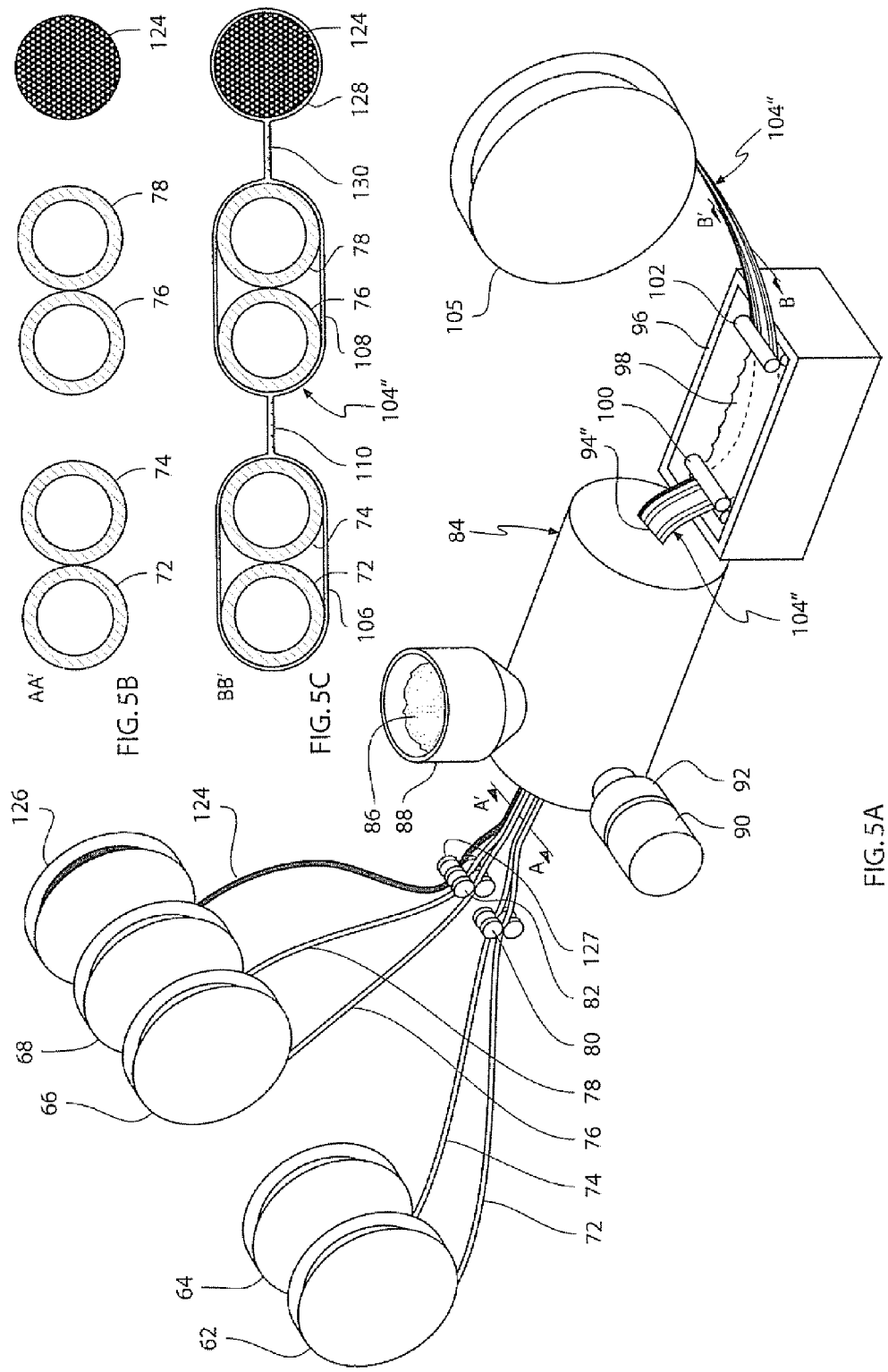

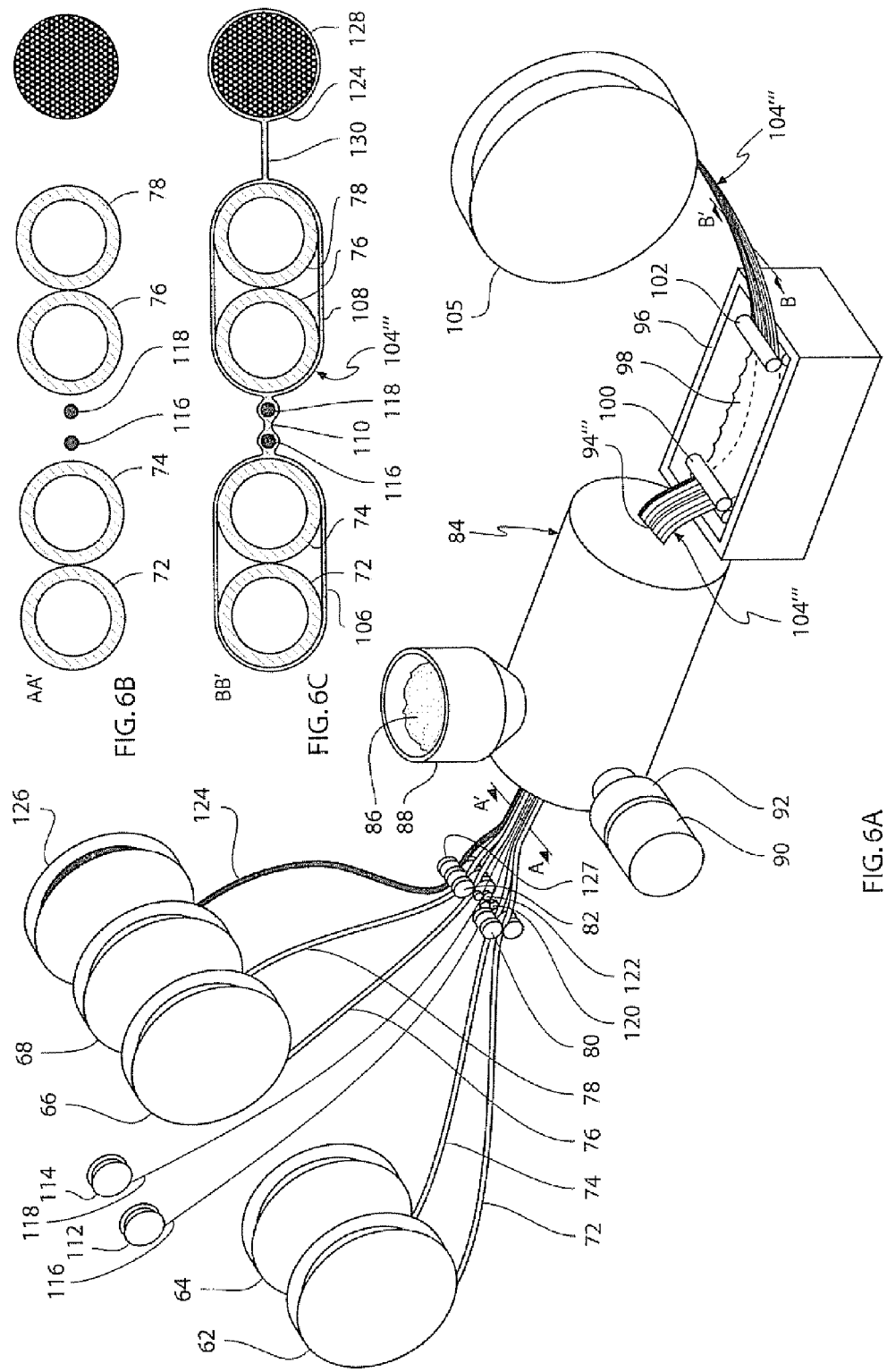

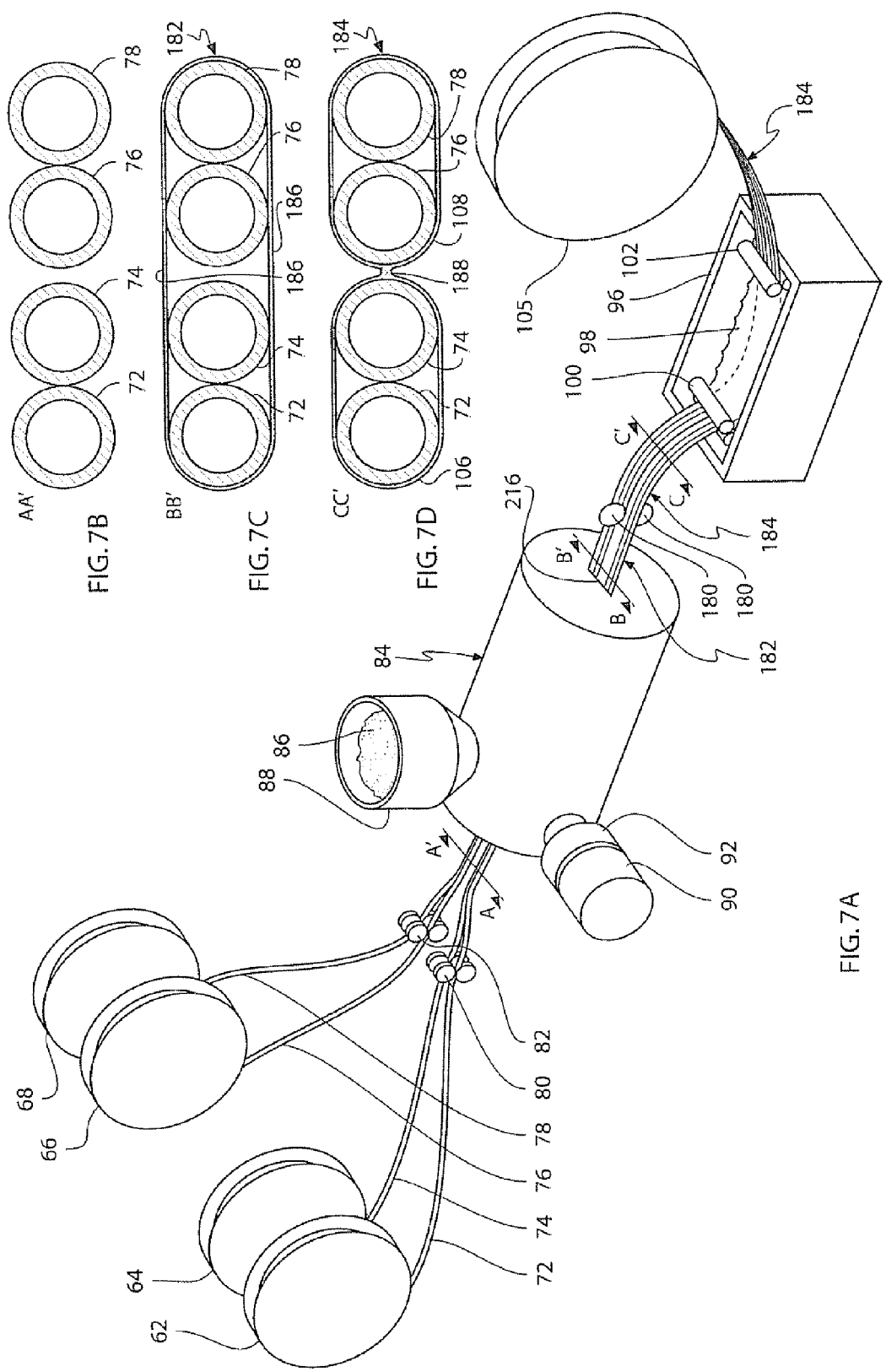

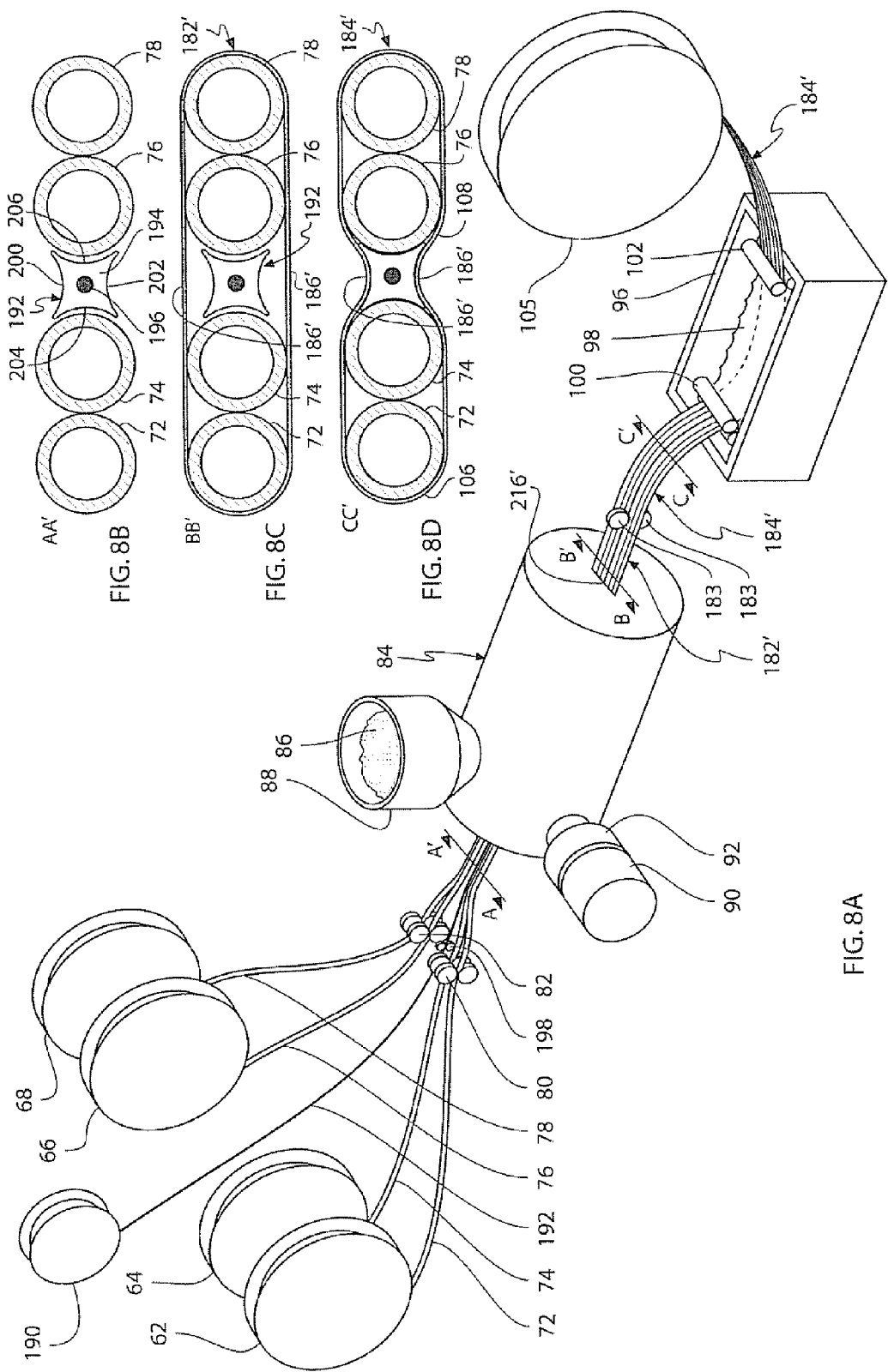

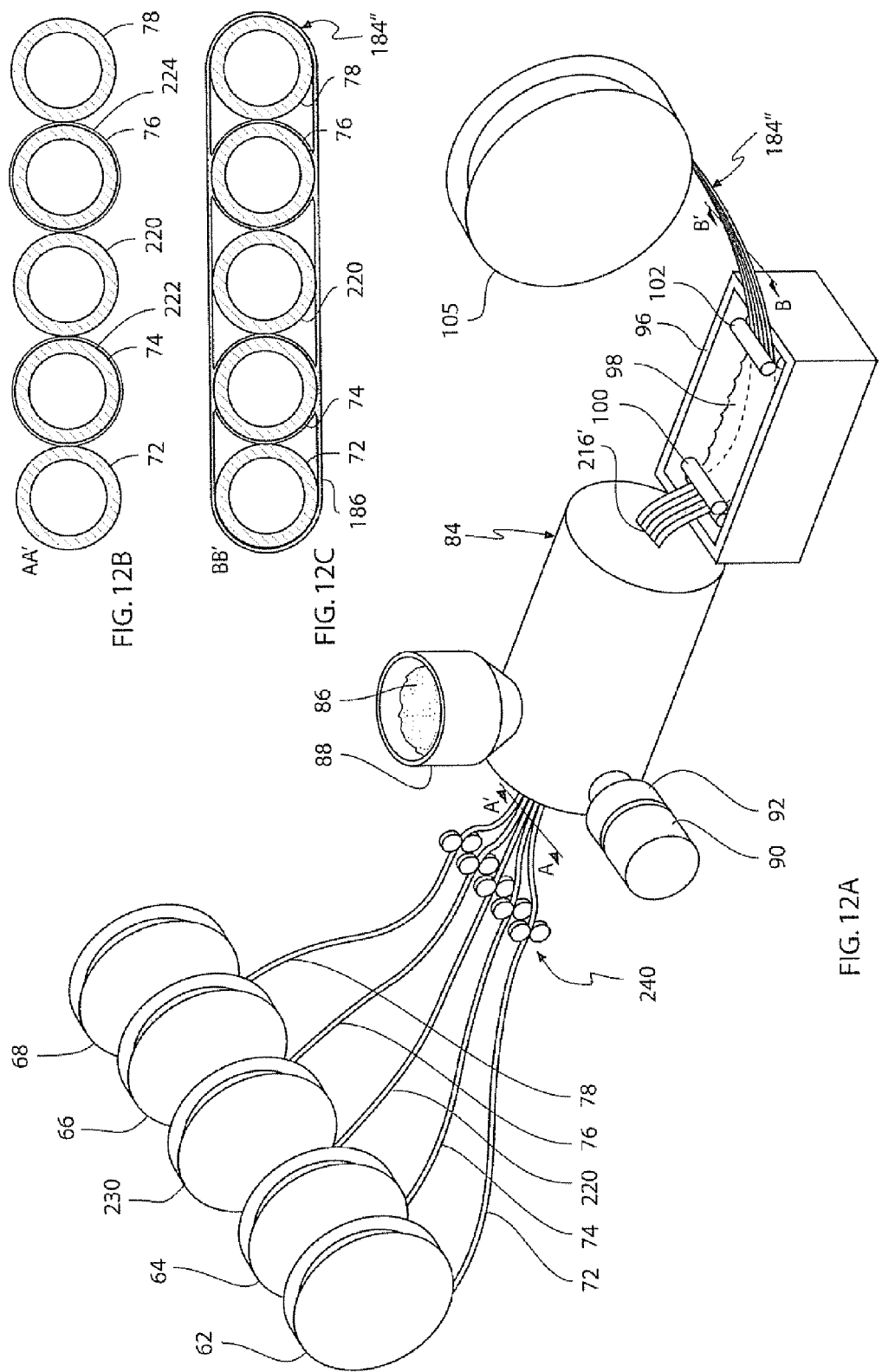

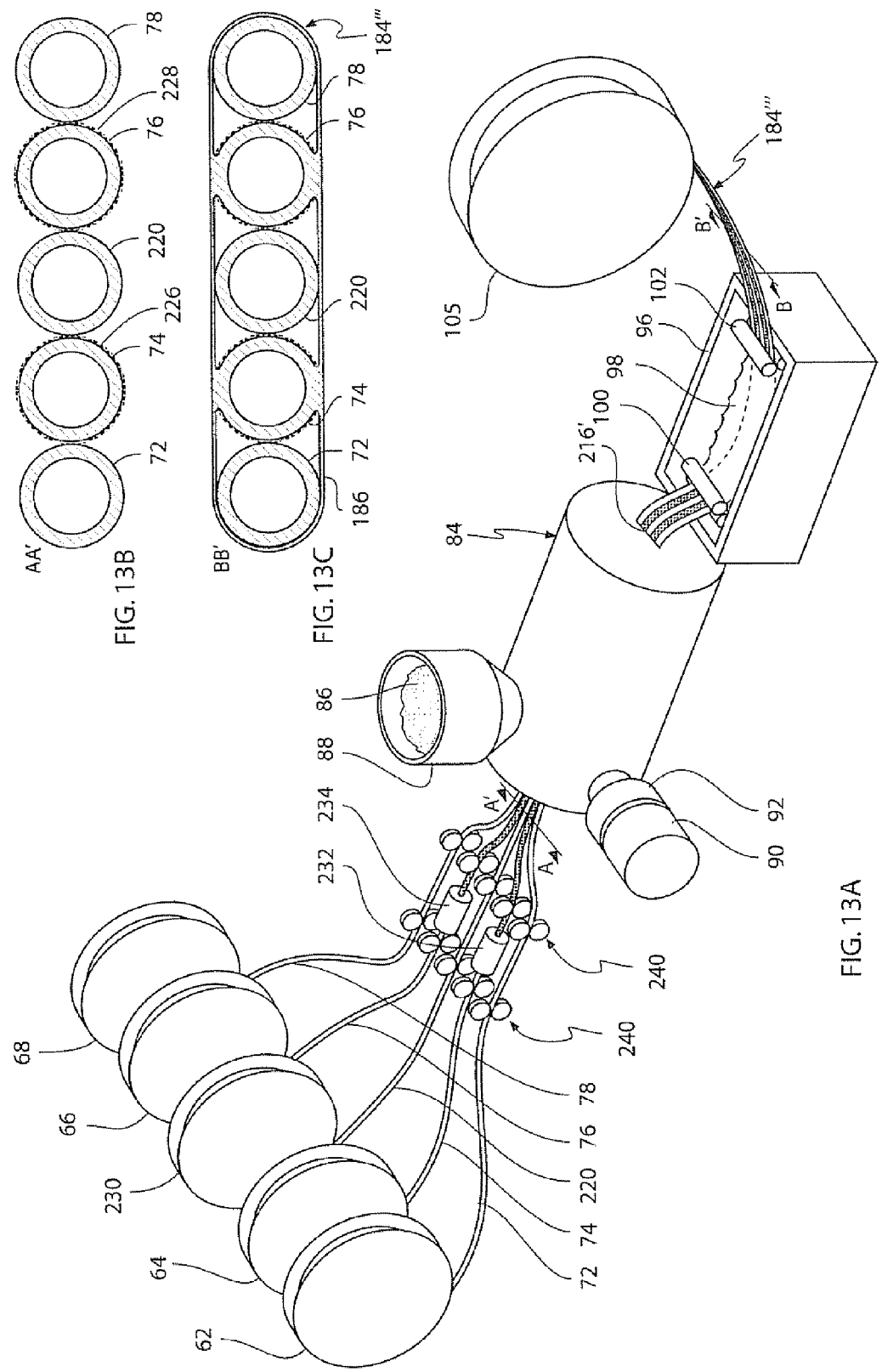

OPTICAL FIBRE GUIDING

CROSS-REFERENCE TO RELATED APPLICATION

This application is a national phase filing, under 35 U.S.C. §371(c), of International Application No. PCT/EP2011/066153, filed Sep. 16, 2011, the disclosure of which is incorporated herein by reference in its entirety.

FEDERALLY SPONSORED RESEARCH OR DEVELOPMENT

Not Applicable

BACKGROUND

The present invention generally relates to protecting and guiding optical fibre cables. More specifically, the present invention relates to an assembly allowing optical fibres to be guided subsequent to the assembly being installed.

RELATED TECHNOLOGY

It is known to use flat multi-cables composed of a multitude of parallel tubes for guiding and protecting optical fibre cables. The multi-cables are commonly stored and transported on cable drums. When installing these multi-cables, a trench from a few meters to several kilometers in length is dug into the ground. A single flat multi-cable is rolled out from a cable drum and placed in the trench, which is subsequently filled. Optical fibre cables are inserted into the multi-cable after it has been rolled out, either prior or subsequent to filling the trench. The multi cables may also be placed in a channel or duct in which the temperature changes with the seasons.

There are a number of problems associated with flat multi-cables. In order to allow it to be wound on and off a cable drum, the multi-cable must have a certain transverse flexibility. However, it must also have a certain degree of stiffness and strength for protecting optical fibre cables. Flat multi-cables may bend or fold transversely when ploughed directly into the ground.

The multi-cable must also be able to follow a straight line subsequent to being rolled out from the cable drum. It has been found that the longitudinal thermal expansion of multi-cables is a problem, in particular when installing multi-cables of significant lengths, e.g. multi-cable several kilometers in length. For example, the multi-cable may be placed in a straight line in a trench at a certain ambient temperature. Later, when the trench is to be filled, the temperature may have increased or decreased, causing the multi-cable to expand or contract longitudinally. With fixed end positions or fixed positions along its length, this will cause the multi-cable to diverge from the straight line in an undulating fashion and possibly also cause the multi-cable to twist.

If a multi-cable is placed inside a channel or duct, a temperature difference between summer and winter may cause problems to the installations. During winter, the multi-cable may disappear into the channel or duct and break contact with the part of the installation that is outside the channel or duct. During summer, the multi-cable may push out from the channel or duct and cause damage to the part of the installation that is outside the channel or duct, e.g. in a manhole. If a channel or duct housing a multi-cable is opened during summer, e.g. for installing additional multi-cables, the multi-cables already present may expand and prevent the channel or duct from being closed again.

It is an object of the present invention to improve the reliability of multi-cables when installing them. It is also an object of the present invention to provide a multi-cable that is easy to install. Further, it is also an object to provide a flat multi-cable having a small longitudinal thermal expansion and to provide flat multi-cables having different transverse flexibility.

SUMMARY

A particular feature of the present invention is that outer tubular shells and an interconnecting strip are extruded in a single extrusion process for positioning and orienting the guide tubes relative to one another, wherein the single extrusion establishes an interference fitting between the guide tubes and the outer tubular shells. The single extrusion process has the effect that there will be no seams in the structure, which will allow the assembly to flex more without breaking the outer tubular shells. The interference fitting between the guide tubes and the outer tubular shells also allows for some slippage between the guide tubes when positioning the assembly on an uneven surface and subjecting it to a heavy load from above, thus reducing the risk for breakage. The single extrusion process establishing the interference fitting has the advantage that the flat multi-cable is both flexible and provides a good protection for the optical fibre cables. Additional objects, features, and advantages will be evident from the disclosure of the different aspects of the present invention given below.

According to the first aspect of the present invention an assembly for guiding and protecting optical fibre cables or wave guides comprises: a first number of first guide tubes and a second number of second guide tubes, each of the first and second guide tubes being adapted for receiving an optical fibre cable along its complete length; the assembly further comprises: an elongated first tubular shell, and an elongated second tubular shell, the first number of first guide tubes being supported within and in parallel relationship with the first tubular shell, and the second number of second guide tubes being supported within and in parallel relationship with the second tubular shell; the assembly further comprises: a first connecting strip interconnecting the first and second tubular shells, defining a separation between the first and second tubular shells, and positioning the first number of first guide tubes and the second number of second guide tubes in parallel, the first and second tubular shells and the first connecting strip originating from a single extrusion process establishing an interference fitting between the first and second guide tubes and the first and second tubular shells, respectively.

According to the second aspect of the present invention an assembly for guiding and protecting optical fibre cables or optical wave guides comprises: a first number of first guide tubes and a second number of second guide tubes, each of the first and second guide tubes being adapted for receiving an optical fibre cable along its complete length, the assembly further comprising: an elongated spacer parallel to and interposed between the first number of first guide tubes and the second number of second guide tubes, the elongated spacer forming a first outer surface and an opposite second outer surface, an elongated tubular shell parallel to and enveloping the first number of first guide tubes, the second number of second guide tubes, and the elongated tubular shell being fixed in a facial relationship to the first and second outer surfaces for forming a first tubular shell enveloping and supporting the first number of first guide tubes and a second tubular shell enveloping and supporting the second number of second guide tubes and for holding the first and second guide tubes in a fixed relationship relative to one another, the elongated tubular shell originating from a single extrusion process and establishing an interference fitting between the first and second guide tubes and the first and second tubular shells, respectively.

According to the third aspect of the present invention an assembly for guiding and protecting optical fibre cables or optical wave guides comprising: a first number of first guide tubes and a second number of second guide tubes, each of the first and second guide tubes being adapted for receiving an optical fibre cable along its complete length, the assembly further comprising: an elongated tubular shell parallel to and enveloping the first number of first guide tubes and the second number of second guide tubes and two opposite sides of the elongated tubular shell being fused together in an elongated notch for forming a first tubular shell enveloping and supporting the first number of first guide tubes and a second tubular shell enveloping and supporting the second number of second guide tubes and for holding the first and second guide tubes in a fixed relationship relative to one another, the elongated tubular shell originating from a single extrusion process and the elongated notch establishing an interference fitting between the first and second guide tubes and the first and second tubular shells, respectively, and substantially preventing a transverse flexing of the assembly.

Holding the first and second guide tubes in a fixed relationship relative to one another should be understood as holding the first number first guide tubes in a fixed relationship relative to one another, holding the second number second guide tubes in a fixed relationship relative to one another, and holding the first number first guide tubes in a fixed relationship relative to the second number of second guide tubes.

The parallel relationship referred to above between the guide tubes and the tubular shells is understood to mean that the corresponding guide tubes and tubular shells are substantially parallel over a length that is substantially greater than the width and the height of the assembly. The assembly may be wound on a cable drum for storage and transport. However, the parallel relationship refers to the assembly in an unwound state when positioned on a planar surface with the common plane parallel to the surface.

Interference fitting is understood to mean a fitting established between two or more parts that is achieved by pressing them together. This includes frictional fitting, shrink fitting, and combinations thereof. This has the advantage that the assembly can be tightly wound on a cable drum in a side by side fashion in several layers, and that it can be folded together to pass a narrow passage without twisting.

The first number may be equal to or greater than two, such as in one or more of the intervals 2-10, 2-8, 2-6, 2-4, 3-10, 4-10, or 5-10, and/or the second number may be equal to or greater than two, such as in one or more of the intervals 2-10, 2-8, 2-6, 2-4, 3-10, 4-10, or 5-10, or alternatively in one or more of the closed intervals 2-4, 4-6, 6-8, and 8-10.

In the first aspect of the present invention, the first connecting strip may position the first and second guide tubes in a common plane. In all of the above aspects of the present invention, the first and second guide tubes may be positioned in a common plane. This has the effect that the assembly may be readily installed on a planar surface, e.g. in a trench having a planar bottom. The position in a common plane is understood to mean that the first and second guide tubes are substantially co-planar over a length that is substantially greater than the width and the height of the assembly. The coplanarity has the further effect that the assembly will have a high flexibility in a direction normal to the common plane, allowing the assembly to be readily collected on a cable drum for storage and transport. However, the position in a common plane refers to the assembly in an unwound state, e.g. either before being wound on a cable drum or after being unwound from a cable drum. The first and second guide tubes being positioned in a common plane is understood to mean that the longitudinal central axes of the first and second guide tubes are in a common plane.

The first tubular shell, the second tubular shell, and the connecting strip of the first aspect of the present invention may have an approximately uniform and approximately equal thickness.

The first and second guide tubes may define an inner surface that is circular cylindrical and undulating to define longitudinal tracks for reducing the friction when inserting and guiding optical fibre in them.

Each of the first number of first guide tubes and the second number of second guide tubes may be circular cylinders with approximately the same outer diameter and defining a central axis, the central axes of the first and second guide tubes and the first connecting strip may be in a common plane. This has the effect that the width of the connecting strip is minimized for a given width of the assembly. Further, this also allows for reflection symmetry with respect to the common plane. Thus, if the guide tubes and the tubular shells are manufactured of materials having different longitudinal thermal expansion coefficients, the symmetry will prevent the assembly from bending in a direction normal to the common plane when the temperature changes. Alternatively, each of the first number of first guide tubes and the second number of second guide tubes may be circular cylinders with approximately the same outer diameter and defining a central axis, the central axes of the first and second guide tubes may be in a common plane and, the first connecting strip may be in parallel relation with the common plane and defining a separation to the common plane that is less than one half of the outer diameter, or a separation to the common plane that is less than one third of the outer diameter, or a separation to the common plane that is less than one sixth of the outer diameter, or a separation to the common plane that is approximately one third of the outer diameter, or a separation to the common plane that is approximately one sixth of the outer diameter.

The first number of first guide tubes and the second number of second guide tubes may be circular cylinders with approximately the same outer diameter and the width of the connecting strip may be less than the outer diameter, or less than two thirds of the outer diameter, or less than one third of the outer diameter, or approximately equal to two thirds of the outer diameter, or approximately equal to one third of the outer diameter. The connecting strip may be flexible so as to allow the assembly to flex along the connecting strip.

The first number and the second number may be equal. This allows for relection symmetry along a plane intersecting the first connecting strip lengthwise. Thus, if the guide tubes and the tubular shells are manufactured of materials having different longitudinal thermal expansion coefficients, the symmetry will prevent the assembly from bending in a direction normal to the intersecting plane when the temperature changes.

All guide tubes of the first and second guide tubes may have approximately the same longitudinal thermal expansion. This has the effect that the guide tubes themselves will not contribute to a bending of the assembly when the temperature changes. All guide tubes of the first and second guide tubes may exhibit approximately the same heating when subjected to sunlight. This has the effect that the guide tubes themselves will not contribute to a bending of the assembly when subjected to sunlight, e.g. when being installed in a shallow trench under sunny conditions.

The longitudinal thermal expansion of the first and second guide tubes may be approximately equal to or smaller than the longitudinal thermal expansion of the first and second tubular shells. This will prohibit the guide tubes from breaking the tubular shells when the temperature increases.

In the first aspect of the present invention, the melting point of the first and second guide tubes may be approximately equal to or greater than the melting point of the first and second tubular shells. In the second and third aspects of the present invention, the melting point of the first and second guide tubes being approximately equal to or greater than the melting point of the elongated tubular shell. This allows for a strong interference fitting to be established in the single extrusion process.

The assembly according to the first aspect of the present invention may further comprise: a third number of elongated strength elements in parallel relationship with the first and second guide tubes and embedded in the first connecting strip, and the longitudinal thermal expansion of the third number of strength elements may be smaller than the longitudinal thermal expansion of the first and second guide tubes.

The assembly according to the second aspect of the present invention may further comprise: a third number of elongated strength elements parallel to and positioned in the elongated spacer, and the longitudinal thermal expansion of the third number of strength elements being smaller than the longitudinal thermal expansion of the first and second guide tubes. This has the same overall advantage as the elongated strength elements according to the first aspect of the present invention. The elongated spacer may have a symmetrical cross-section. This has the advantage that the elongated spacer more easily can be oriented relative to the first and second guide tubes.

This has the effect that the longitudinal thermal expansion of the assembly as a whole is reduced. The longitudinal thermal expansion of the third number of strength elements may be negative and the longitudinal thermal expansion of the first and second guide tubes may be positive. This allows for an assembly that has a small or insignificant longitudinal thermal expansion as a whole under normal ambient temperature variations. A negative longitudinal thermal expansion is here defined as corresponding to a negative longitudinal thermal expansion coefficient, and a positive longitudinal thermal expansion is here defined as corresponding to a positive longitudinal thermal expansion coefficient. The third number of elongated strength elements may limit the longitudinal thermal expansion of the assemblies to one or more of the ranges 0.01-0.02 mm/m/° C., 0.02-0.03 mm/m/° C., 0.03-0.04 mm/m/° C., 0.04-0.05 mm/m/° C., 0.05-0.06 mm/m/° C., 0.06-0.07 mm/m/° C., 0.07-0.08 mm/m/° C., 0.08-0.09 mm/m/° C., 0.09-0.10 mm/m/° C., and/or to one or more of the ranges 0.01-0.9 mm/m/° C., 0.02-0.08 mm/m/° C., 0.03-0.07 mm/m/° C., 0.04-0.06 mm/m/° C., or approximately 0.05 mm/m/° C., and/or to below 0.10 mm/m/° C., below 0.08 mm/m/° C., below 0.06 mm/m/° C., below 0.04 mm/m/° C., below 0.02 mm/m/° C., below 0.01 mm/m/° C. The third number may be in one or more of the ranges 2-4, 2-6, and 2-8, or preferably 2.

The third number of elongated strength elements embedded in the first connecting strip of the first aspect of the present invention and positioned in the elongated spacer of the second aspect of the present invention are particularly advantageous if the guide tubes are circular cylinders with central axes in a common plane with the first connecting strip or elongated spacer. The symmetry thus defined will prevent the assembly from bending normal to the common plane when the temperature changes.

The third number may be equal to 1, 2, 3, or 4. The third number of strength elements may comprise: a first strength element and a second strength element, the first strength element defining a first separation distance to the first tubular shell and the second strength element defining a second separation distance to the second tubular shell, the first and second separation distances being approximately equal. This allows for a connecting strip without any strength elements along its centre that also exhibits a reflection symmetry preventing sideways bending. A centre free from any strength element allows for a flexing with the centre of the connecting strip as a pivot axis.

The third number of elongated strength elements may comprise aramid fibres. Each of the third number of elongated strength elements may be a wire comprising aramid fibres. It has been found that this feature is particularly advantageous for reducing the longitudinal thermal expansion of the assembly as a whole.

The assembly according to the first aspect of the present invention may further comprise: a fourth number of elongated auxiliary strength elements in parallel relationship with the first number of first guide tubes and embedded in the first tubular shell, and the longitudinal thermal expansion of the fourth number of auxiliary strength elements being smaller than the longitudinal thermal expansion of the first number of first guide tubes.

The assemblies according to the second and third aspects of the present invention may further comprise: a fourth number of elongated auxiliary strength elements in parallel relationship with the first number of first guide tubes and embedded in the elongated tubular shell, and the longitudinal thermal expansion of the fourth number of auxiliary strength elements may be smaller than the longitudinal thermal expansion of the first number of first guide tubes.

The first and second guide tubes may be manufactured of high-density polyethylene and in the first aspect of the present invention the first and second tubular shells may be manufactured of low-density polyethylene and in the second aspect of the present invention the elongated tubular shell may be manufactured of low-density polyethylene. These particular combinations have been found to be particularly advantageous with respect to providing the proper strength and flexibility of the assembly.

The third number of elongated strength elements may be under tension for exerting a longitudinally contracting force on the assembly. This has the effect that the longitudinal thermal expansion of the assembly as a whole may be reduced further, in particular if the third number of elongated strength elements comprises aramid fibres.

The first and second guide tubes may be positioned in a common plane, the fourth number may be greater than one, and the fourth number of elongated auxiliary strength elements may be positioned in a symmetric pattern relative to the common plane. Being positioned in a symmetric pattern relative to the common plane may encompass a pattern having elongated auxiliary strength elements positioned on both sides of the common plane and the elongated auxiliary strength elements on one side of the common plane defining a reflection or rotational symmetry relative to the elongated auxiliary strength elements on the other side of the common plane.

The assembly according to the above mentioned aspects of the present invention may further comprise: an electrical power cable, and the electrical power cable may be supported within and in parallel relationship with the first tubular shell. Alternatively, the electrical power cable may be supported within and in parallel relationship with the second tubular shell. The first and second tubular shells and the first connecting strip may position the power cable and the first and second guide tubes in a common plane. The power cable and the first and second guide tubes being positioned in a common plane is understood to mean that the longitudinal central axes of the power cable and the first and second guide tubes are coplanar. The single extrusion process may establish an interference fitting between the electrical power cable and the first tubular shell.

The assembly according to the first aspect of the present invention may further comprise: a single-stranded or multi-stranded strength wire, an elongated third tubular shell, and the strength wire may be supported within and in parallel relationship with the third tubular shell; the assembly may further comprise: a second connecting strip interconnecting the first and third tubular shells and defining a separation between the first and second tubular shells, or a second connecting strip interconnecting the second and third tubular shells and defining a separation between the second and third tubular shells, the second connecting strip may position the strength wire in parallel relationship with the first number of first guide tubes and the second number of second guide tubes, and the third tubular shell and the second connecting strip may originate from the single extrusion process. The single extrusion process may establish an interference fitting between the single-stranded or multi-stranded metal strength wire and the third tubular shell. The strength wire may be of a metal optimised for withstanding heavy loads, such as steel wires. The strength wire may be adapted for supporting the assembly in a hanging arrangement above ground.

The first and second connecting strip may position the first and second guide tube and the strength wire in a common plane. This has the effect that the assembly will not bend in a direction normal to the common plane when the temperature changes. The strength wire and the first and second guide tubes being positioned in a common plane is understood to mean that the longitudinal central axes of the strength wire and the first and second guide tubes are coplanar.

The strength wire may have a diameter in one or more of the ranges 10-12 mm, 12-14 mm, 14-16 mm, 16-18 mm, 18-20 mm, 20-22 mm, 22-24 mm, 10-24 mm, 12-22 mm, 14-20 mm, 16-18 mm, or approximately 17 mm. It has been found that these specific diameters allow the assembly to withstand the stresses and loads typical for ploughing the assembly into the ground with a cable plough.

The elongated spacer of the assembly according to the second aspect of the present invention may form a first concave surface positioned between the first and second outer surfaces for cooperating with a guide tube of the first number of first guide tubes. The elongated spacer may form a second concave surface positioned between the first and second outer surfaces for cooperating with a guide tube of the second number of second guide tubes.

According to the fourth aspect of the present invention a method for manufacturing an assembly for guiding and protecting optical fibre cables or wave guides comprises: providing a first number of first guide tubes and a second number of second guide tubes, each of the first and second guide tubes being adapted for receiving an optical fibre cable along its complete length, orienting the first number of first guide tubes and the second number of second guide tubes in parallel, and extruding in a single extrusion process an elongated first tubular shell around the first number of first guide tubes, an elongated second tubular shell around the second number of second guide tubes, and a first connecting strip in parallel relationship with the first and second guide tubes and interconnecting the first and second tubular shells for defining a fixed separation between the first and second tubular shells, the single extrusion process further establishing an interference fitting between the first and second guide tubes and the first and second tubular shells, respectively. The single extrusion process allows for an assembly having tubular shells and connecting strips without any seams in or between them. Further, the single extrusion process allows for an assembly having a uniform flexibility along its complete length.

According to the fifth aspect of the present invention a method for manufacturing an assembly for guiding and protecting optical fibre cables or optical wave guides comprises: providing a first number of first guide tubes and a second number of second guide tubes, each of the first and second guide tubes being adapted for receiving an optical fibre cable along its complete length, providing an elongated spacer forming a first outer surface and an opposite second outer surface, orienting the first number of first guide tubes and the second number of second guide tubes in parallel, positioning the elongated spacer between the first number of first guide tubes and the second number of second guide tubes, extruding in a single extrusion process an elongated tubular shell around the first number of first guide tubes, the second number of second guide tubes, and the elongated spacer, and fixing the elongated tubular shell in facial relationship to the first and second outer surfaces of the elongated spacer for forming a first tubular shell enveloping and supporting the first number of first guide tubes and a second tubular shell enveloping and supporting the second number of second guide tubes and for holding the first and second guide tubes in a fixed relationship relative to one another.

The fixing of the elongated tubular shell in facial relationship to the first and second outer surfaces may comprise pressing the elongated tubular shell against the first outer surface of the elongated spacer with a roller. The fixing of the elongated tubular shell in facial relationship to the first and second outer surfaces may comprise pressing the elongated tubular shell against the first and second outer surfaces between two counter-rotating rollers.

According to the fifth aspect of the present invention a method for manufacturing an assembly for guiding and protecting optical fibre cables or optical wave guides comprises: providing a first number of first guide tubes and a second number of second guide tubes, each of the first and second guide tubes being adapted for receiving an optical fibre cable along its complete length, orienting the first number of first guide tubes and the second number of second guide tubes in parallel, positioning the elongated spacer between the first number of first guide tubes and the second number of second guide tubes, extruding in a single extrusion process an elongated tubular shell around the first number of first guide tubes, the second number of second guide tubes, and the elongated spacer, and fusing the elongated tubular shell along an elongated notch for forming a first tubular shell enveloping and supporting the first number of first guide tubes and a second tubular shell enveloping and supporting the second number of second guide tubes and for holding all of the first and second guide tubes in a fixed relationship relative to one another.

The fusing of the elongated tubular shell along an elongated notch may comprise pressing the elongated tubular shell together between the first number of first guide tubes and the second number of second guide tubes with a rotating disc. The fusing of the elongated tubular shell along an elongated notch comprising pressing the elongated tubular shell together between the first number of first guide tubes and the second number of second guide tubes with two counter-rotating discs.

Several of the features of the fourth, fifth, and sixth aspects of the present invention result in features of the manufactured assembly that are discussed in relation to the first, second, and third aspects of the present invention. The effects and advantages presented in relation to the first aspect of the present invention are therefore not all repeated here.

The method according to the fourth, fifth, and sixth aspects of the present invention may further comprise: controlling the temperature of the first and second guide tubes prior to the single extrusion process for preventing a transverse contracting of the first and second guide tubes that is greater than the transverse contracting of the first and second tubular shells in the single extrusion process. A transverse contracting is a contracting perpendicular to the direction of extension of the guide tubes. This allows for a well functioning interference fitting between the first and second guide tubes and the first and second tubular shells, respectively.

The method according to the fourth, fifth, and sixth aspects of the present invention may further comprise: positioning the first number of first guide tubes and the second number of second guide tubes in a common plane. This particular positioning may occur prior or simultaneous with the single extrusion process.

The method according to the fourth aspect of the present invention may further comprise: positioning the first number of first guide tubes and the second number of second guide tubes with a separation between them for defining a first width of the first connecting strip throughout its length in the single extrusion process. This particular positioning may occur prior or simultaneous with the single extrusion process.

The first number of first guide tubes and the second number of second guide tubes may be circular cylinders with approximately the same outer diameter and defining a central axis, and the method according to the fourth aspect of the present invention may further comprise: extruding in the single extrusion process the first connecting strip in a common plane with the central axes of the first and second guide tubes.

The method according to the fourth aspect of the present invention may further comprise: providing a third number of elongated strength elements, the longitudinal thermal expansion of the third number of strength elements being smaller then the longitudinal thermal expansion of the first and second guide tubes, orienting the third number of strength elements in parallel relationship with the first and second guide tubes, and embedding the third number of strength elements in the first connecting strip in the single extrusion process. The orienting may occur prior or simultaneous with the single extrusion process. The embedding allows for a fitting or fixation of the third number of strength elements within the first connecting strip that is strong without significantly reducing the flexibility of the assembly.

The elongated spacer according to the fifth aspect of the present invention may comprise a third number of elongated strength elements parallel to and positioned in the elongated spacer.

The third number of elongated strength elements may limit the longitudinal thermal expansion of the assembly to one or more of the ranges 0.01-0.02 mm/m/° C., 0.02-0.03 mm/m/° C., 0.03-0.04 mm/m/° C., 0.04-0.05 mm/m/° C., 0.05-0.06 mm/m/° C., 0.06-0.07 mm/m/° C., 0.07-0.08 mm/m/° C., 0.08-0.09 mm/m/° C., 0.09-0.10 mm/m/° C., and/or to one or more of the ranges 0.01-0.9 mm/m/° C., 0.02-0.08 mm/m/° C., 0.03-0.07 mm/m/° C., 0.04-0.06 mm/m/° C., or approximately 0.05 mm/m/° C., and/or to below 0.10 mm/m/° C., below 0.08 mm/m/° C., below 0.06 mm/m/° C., below 0.04 mm/m/° C., below 0.02 mm/m/° C., below 0.01 mm/m/° C. The third number of strength elements may comprise a first strength element and a second strength element, and the method may further comprise: positioning the first strength element to define a first separation distance to the first tubular shell subsequent to the single extrusion, and positioning the second strength element to define a second separation distance to the second tubular shell subsequent to the single extrusion, and the first and second separation distances being approximately equal.

The third number may be equal to 1, 2, 3, or 4. The third number of elongated strength elements may comprise aramid fibres. Each of the third number of elongated strength elements may be a wire comprising aramid fibres.

The method according to the fourth aspect of the present invention may further comprise: providing a fourth number of elongated auxiliary strength elements, the longitudinal thermal expansion of the fourth number of auxiliary strength elements may be smaller than the longitudinal thermal expansion of the first number of first guide tubes, orienting the fourth number of auxiliary strength elements in parallel relationship with the first number of first guide tubes, and embedding the fourth number of auxiliary strength elements in the first tubular shell in the single extrusion.

The methods according to the fifth and sixth aspects of the present invention may further comprise: providing a fourth number of elongated auxiliary strength elements, the longitudinal thermal expansion of the fourth number of auxiliary strength elements being smaller than the longitudinal thermal expansion of the first number of first guide tubes, orienting the fourth number of auxiliary strength elements in parallel relationship with the first number of first guide tubes, and embedding the fourth number of auxiliary strength elements in the elongated tubular shell in the single extrusion.

The method according to the fourth aspect of the present invention may further comprise: providing an electrical power cable, orienting the electrical power cable in parallel relationship with the first number of first guide tubes, and extruding the elongated first tubular shell around the electrical power cable in the single extrusion process. The method according to the fifth and sixth aspects of the present invention may further comprise: providing an electrical power cable, orienting the electrical power cable in parallel relationship with the first number of first guide tubes, and extruding the elongated tubular shell around the electrical power cable in the single extrusion process. The method according to the fourth, fifth, and sixth aspects of the present invention may further comprise: positioning the power cable and the first and second guide tubes in a common plane.

The method according to the fourth aspect of the present invention may further comprise: providing a single-stranded or multi-stranded metal strength wire, orienting the strength wire in parallel with the first number of first guide tubes and the second number of second guide tubes, and extruding in the single extrusion process an elongated third tubular shell around the strength wire, and a second connecting strip interconnecting the first and third tubular shells and defining a separation between the first and second tubular shells, or a second connecting strip interconnecting the second and third tubular shells and defining a separation between the second and third tubular shells. The method according to the fifth and sixth aspects of the present invention may further comprise: providing a single-stranded or multi-stranded metal strength wire, orienting the strength wire in parallel with the first number of first guide tubes and the second number of second guide tubes, and extruding in the single extrusion process an elongated third tubular shell around the strength wire, and a second connecting strip interconnecting the elongated tubular shell and the third tubular shell. The method according to the fourth, fifth, and sixth aspects of the present invention may further comprise: positioning the first number of first guide tubes, the second number of second guide tubes, and the strength wire in a common plane.

The method according to the fourth, fifth and sixth aspects of the present invention may further comprise: submerging the assembly subsequent to the single extrusion in a first cooling liquid for lowering the temperature of the assembly. The providing of the first number of first guide tubes and the second number of second guide tubes may comprise: extruding the first and second guide tubes. The providing of the first number of first guide tubes and the second number of second guide tubes may comprise: submerging the first and second guide tubes in a second cooling liquid for lowering the temperature of the first and second guide tubes. The providing of the first number of first guide tubes and the second number of second guide tubes may comprise: inserting a spherical object into one or more of the first and second guide tubes, and applying a pressurized fluid to one or more of the first and second guide tubes for pushing the spherical object through the one or more first and second guide tubes.

According to any of the aspects of the present invention, a guide tube of the first number of first guide tubes may comprise an outer tube of a fibre reinforced material and an inner lining of a non-fibre reinforced material. According to the second and fifth aspects of the present invention the elongated spacer may comprise a fibre reinforced material. The fibres of the fibre reinforced materials may be fibres, filaments, yarns, or similar elongated objects commonly used for reinforcing plastics. The fibres may be aramid fibres. The fibres may be oriented in the general longitudinal direction of extension of the assembly. The aramid fibres have the effect that the longitudinal thermal expansion of the fibre reinforced guide tube is reduced; consequently, the longitudinal thermal expansion of the assembly as a whole is reduced. Fibres of the outer tube may cause its surface to be coarse and uneven, which increases the friction when introducing optical fibres. The inner lining of the non-fibre reinforced material prevents the increase in the friction.

The assembly produced by the method according to the fourth, fifth and sixth aspects of the present invention may comprise any of the features of the assembly according to the first, second, and third aspects of the present invention. The assembly according the first, second, and third aspects of the present invention may comprise any of the features resulting from the method according to the fourth, fifth and sixth aspects of the present invention.

According to the seventh aspect of the present invention an assembly for guiding and protecting optical fibre cables or wave guides comprises: a first guide tube adapted for receiving an optical fibre cable along its complete length; the assembly further comprises: an elongated first tubular shell, the first guide tubes being supported within and in parallel relationship with the first tubular shell, and the first tubular shell originating from a single extrusion process establishing an interference fitting between the first guide tube and the first tubular shell.

The longitudinal thermal expansion of the first guide tube may be approximately equal to or smaller than the longitudinal thermal expansion of the first tubular shell. Additionally or alternatively, the melting point of the first guide tube may be approximately equal to or greater than the melting point of the first tubular shell.

The assembly according to the seventh aspect of the present invention may further comprise: a fifth number of elongated strength elements in parallel relationship with the first guide tube and embedded in the first tubular shell, and the longitudinal thermal expansion of the fifth number of strength elements being smaller than the longitudinal thermal expansion of the first guide tube.

The a fifth number of elongated strength elements may limit the longitudinal thermal expansion of the assembly to one or more of the ranges 0.01-0.02 mm/m/° C., 0.02-0.03 mm/m/° C., 0.03-0.04 mm/m/° C., 0.04-0.05 mm/m/° C., 0.05-0.06 mm/m/° C., 0.06-0.07 mm/m/° C., 0.07-0.08 mm/m/° C., 0.08-0.09 mm/m/° C., 0.09-0.10 mm/m/° C., and/or to one or more of the ranges 0.01-0.9 mm/m/° C., 0.02-0.08 mm/m/° C., 0.03-0.07 mm/m/° C., 0.04-0.06 mm/m/° C., or approximately 0.05 mm/m/° C., and/or to below 0.10 mm/m/° C., below 0.08 mm/m/° C., below 0.06 mm/m/° C., below 0.04 mm/m/° C., below 0.02 mm/m/° C., below 0.01 mm/m/° C.

The first guide tube may be circular cylinders and defining a central axis and the first tubular shell may position the central axis of the first guide tube and fifth number of elongated strength elements in a common plane. The fifth number of elongated strength elements may comprise aramid fibres.

The assembly according to the seventh aspect of the present invention may further comprise: an outer strip having two opposing sides defining a uniform width of the strip throughout its length, the outer strip originating from the single extrusion process and being connected to the first tubular shell along one of the two opposing sides, and the assembly may further comprise: a sixth number of electrical cables embedded within the outer strip, and the outer strip and the first tubular shell orienting the sixth number of electrical cables and the first guide tube in a parallel relationship. The first tubular shell and the outer strip may position the fifth number of elongated strength elements and the sixth number of electrical cables in a common plane.

According to the eighth aspect of the present invention a method for manufacturing an assembly for guiding and protecting optical fibre cables or wave guides comprises: providing a first guide tube, the first guide tube being adapted for receiving an optical fibre cable along its complete length, and extruding in a single extrusion process an elongated first tubular shell around the first guide tubes, the single extrusion process further establishing an interference fitting between the first guide tube and the first tubular shell.

The method according to the eighth aspect of the present invention may further comprise: controlling the temperature of the first guide tube prior to the single extrusion process for preventing a transverse contracting of the first guide tube that is greater than the transverse contracting of the first tubular shell in the single extrusion process.

The method according to the eight aspect of the present invention may further comprise: providing a fifth number of elongated strength elements, the longitudinal thermal expansion of the fifth number of strength elements being smaller than the longitudinal thermal expansion of the first guide tube, orienting the fifth number of strength elements in parallel relationship with the first guide tubes, and embedding the fifth number of strength elements in the first tubular shell in the single extrusion process.

The first guide tube may be a circular cylinder with approximately the same outer diameter and defining a central axis, and the method further comprising: positioning the central axis and the fifth number of strength elements in a common plane.

The method according to the eighth aspect of the present invention may further comprise: providing a sixth number of electrical cables, orienting the sixth number of electrical cables in a common plane with respect to one another and in parallel relationship with the first guide tubes, and extruding in the single extrusion process an outer strip having two opposing sides defining a uniform width of the strip throughout its length and connecting to the first tubular shell along one of the two opposing sides, the sixth number of electrical cables being embedded in the outer strip. The method according to the eighth aspect of the present invention may further comprise: positioning the fifth number of strength elements and the sixth number of electrical cables in a common plane. Additionally or alternatively, the method according to the eighth aspect of the present invention may further comprise: submerging the assembly subsequent to the single extrusion in a first cooling liquid for lowering the temperature of the assembly.

The step of providing the first guide tube may comprise: extruding the first guide tube. Additionally or alternatively, the step of providing the first guide tube may comprise: submerging the first guide tube in a second cooling liquid for lowering the temperature of the first guide tube. Additionally or alternatively, the step of providing the first guide tube may comprise: inserting a spherical object into the first guide tube, and applying a pressurized fluid to the first guide tube for pushing the spherical object through the first guide tube. Additionally or alternatively, the assembly produced by the method according to the eighth aspect of the present invention may further comprise any of the features according to the seventh aspect of the present invention.

According to the ninth aspect of the present invention an assembly for guiding and protecting optical fibre cables or optical wave guides comprises: a first number of first guide tubes and a second number of second guide tubes, each of the first and second guide tubes being adapted for receiving an optical fibre cable along its complete length, the assembly further comprising: a third guide tube adapted for receiving an optical fibre cable along its complete length and positioned parallel to and interposed between the first number of first guide tubes and the second number of second guide tubes, the third guide tube defining a first outer surface portion and an opposite second outer surface portion, an elongated tubular shell parallel to and enveloping the first number of first guide tubes, the second number of second guide tubes, and the third guide tube, the elongated tubular shell being fixated in a facial relationship to the first and second outer surface portions for forming a first tubular shell part enveloping and supporting the first number of first guide tubes and a second tubular shell part enveloping and supporting the second number of second guide tubes and for holding the first and second guide tubes in a fixed relationship relative to one another, and the elongated tubular shell originating from a single extrusion process and establishing an interference fitting between the first and second guide tubes and the first and second tubular shell parts, respectively. The fixing of the elongated tubular shell to the first and second outer surface portions has the effect that the transverse flexibility of the assembly is reduced.

The elongated tubular shell may be fixed in the facial relationship to the first and second outer surface portions in the single extrusion process. The assembly according the ninth aspect of the present invention may comprise any of the features according to any of the previous aspects of the present invention.

According to the tenth aspect of the present invention a method for manufacturing an assembly for guiding and protecting optical fibre cables or optical wave guides comprises: providing a first number of first guide tubes of a first material and a second number of second guide tubes of a second material, each of the first and second guide tubes being adapted for receiving an optical fibre cable along its complete length, providing a third guide tube comprising an outer surface layer of a third material, the third guide tube being adapted for receiving an optical fibre cable along its complete length, orienting the first number of first guide tubes and the second number of second guide tubes in parallel, positioning the third guide tube between the first number of first guide tubes and the second number of second guide tubes, extruding in a single extrusion process an elongated tubular shell of a fourth material around the first number of first guide tubes, the second number of second guide tubes, and the third guide tube, the first and second materials being non-joinable with the fourth material and the third material being joinable with the fourth material in the single extrusion process, and fixing the elongated tubular shell in facial relationship to the first and second outer lining portions of the third guide tube for forming a first tubular shell part enveloping and supporting the first number of first guide tubes and a second tubular shell part enveloping and supporting the second number of second guide tubes and for holding the first and second guide tubes in a fixed relationship relative to one another. The fixing of the elongated tubular shell to the first and second outer surface portions has the effect that the transverse flexibility of the assembly is reduced.

The fixing of the elongated tubular shell in facial relationship to the first and second outer lining portions of the third guide tube is performed in the single extrusion process. This has the advantage that the third guide tube is not subjected to unnecessary physical loads in the fixing, such as a pressing between cooperating rollers, which may cause it to deform. The third guide tube may comprise an inner tube of the first or second material, and the outer surface layer may be generated in a co-extrusion with the inner tube. The first and second materials may be essentially the same material and the third and fourth materials being the same or essentially the same material. For example, the first and second materials may be the same or different forms of high-density polyethylene and the third and fourth materials may be the same or different forms of low-density polyethylene. The method according the tenth aspect of the present invention may comprise any of the features according to any of the previous aspects of the present invention.

According to the eleventh aspect of the present invention a method for manufacturing an assembly for guiding and protecting optical fibre cables or optical wave guides comprises: providing a first number of first guide tubes and a second number of second guide tubes, each of the first and second guide tubes being adapted for receiving an optical fibre cable along its complete length, providing a third guide tube with a first outer surface portion and an opposite second outer surface portion, priming the first and second surface portions for increasing their ability to adhere to or fuse with a specific material, orienting the first number of first guide tubes and the second number of second guide tubes in parallel, positioning the third guide tube between the first number of first guide tubes and the second number of second guide tubes, extruding in a single extrusion process an elongated tubular shell of the specific material around the first number of first guide tubes, the second number of second guide tubes, and the third guide tube, and fixing the elongated tubular shell in facial relationship to the first and second outer surface portions of the third guide tube for forming a first tubular shell part enveloping and supporting the first number of first guide tubes and a second tubular shell part enveloping and supporting the second number of second guide tubes and for holding the first and second guide tubes in a fixed relationship relative to one another. The fixing of the elongated tubular shell to the first and second outer surface portions has the effect that the transverse flexibility of the assembly is reduced.

The fixing of the elongated tubular shell in facial relationship to the first and second outer surface portions of the third guide tube may be performed in the single extrusion process. This has the advantage that the third guide tube is not subjected to unnecessary physical loads in the fixing, such as a pressing between cooperating rollers, which may cause it to deform. The priming of said first and second surface portions may comprise a mechanical, chemical, or thermal treatment of the first and second surface portions. The priming of said first and second surface portions may comprise adding a first adhesive layer on the first surface portion and adding a second adhesive layer in the second surface portion. The method according the eleventh aspect of the present invention may comprise any of the features according to any of the previous aspects of the present invention.

All the above specified features are assumed to belong to all aspects of the present invention, even if specified to belong to a particular aspect.

BRIEF DESCRIPTION OF THE DRAWINGS

The above-mentioned objects, features and advantages will be further elaborated upon in the following detailed description in conjunction with the figures:

FIG. 3A illustrates a presently preferred method of manufacturing an assembly for guiding and protecting optical fibre cables;

FIG. 3B is a cross-sectional view of the guide tubes prior to the single extrusion process;

FIG. 3C is a cross-sectional view of a presently preferred guide tube as produced by the method illustrated in FIG. 3A;

FIG. 4A illustrates a method of manufacturing an assembly for guiding and protecting optical fibre cables further including elongated strength elements;

FIG. 4B is a cross-sectional view of the guide tubes and the elongated strength elements prior to the single extrusion process;

FIG. 4C is a cross-sectional view of a guide tube as produced by the method illustrated in FIG. 4A including the elongated strength elements;

FIG. 5A illustrates a method of manufacturing an assembly for guiding and protecting optical fibre cables further including a strength wire;

FIG. 5B is a cross-sectional view of the guide tubes and the strength wire prior to the single extrusion process;

FIG. 5C is a cross-sectional view of a guide tube as produced by the method illustrated in FIG. 5A including the strength wire;

FIG. 6A illustrates a method of manufacturing an assembly for guiding and protecting optical fibre cables further including elongated strength elements and a strength wire;

FIG. 6B is a cross-sectional view of the guide tubes, the elongated strength elements, and the strength wire prior to the single extrusion process;

FIG. 6C is a cross-sectional view of a guide tube as produced by the method illustrated in FIG. 6A including the elongated strength elements and the strength wire;

FIG. 7A illustrates a method of manufacturing an assembly for guiding and protecting optical fibre cables including guide tubes;

FIG. 7B is a cross-sectional view of the guide tubes prior to the single extrusion process;

FIG. 7C is a cross-sectional view of the guide tubes and the elongated tubular shell subsequent to the single extrusion process;

FIG. 7D is a cross-sectional view of the guide tubes and the elongated tubular shell subsequent to fusing the elongated tubular shell in an elongated notch;

FIG. 8A illustrates a method of manufacturing an assembly for guiding and protecting optical fibre cables including guide tubes, an elongated spacer, and a strength elements inside the elongated spacer;

FIG. 8B is a cross-sectional view of the guide tubes, the elongated spacer, and the elongated strength element prior to the single extrusion process;

FIG. 8C is a cross-sectional view of the guide tubes, the elongated spacer, the elongated strength element, and the elongated tubular shell subsequent to the single extrusion process;

FIG. 8D is a cross-sectional view of the guide tubes, the elongated spacer, and the elongated strength element subsequent to fixing the elongated tubular shell to the elongated spacer;

FIG. 12A illustrates a method of manufacturing an assembly for guiding and protecting optical fibre cables;

FIG. 12B is a cross-sectional view of the guide tubes prior to the single extrusion process;

FIG. 12C is a cross-sectional view of a guide tube as produced by the method illustrated in FIG. 12A;

FIG. 13A illustrates a method of manufacturing an assembly for guiding and protecting optical fibre cables;

FIG. 13B is a cross-sectional view of the guide tubes prior to the single extrusion process; and FIG. 13C is a cross-sectional view of a guide tube as produced by the method illustrated in FIG. 13A.

DETAILED DESCRIPTION

The same number indexing is used for identical or similar elements or features in all of the figures. Related elements or features have been given the same number indexing but are distinguished from one another by priming.

Figure 1A:
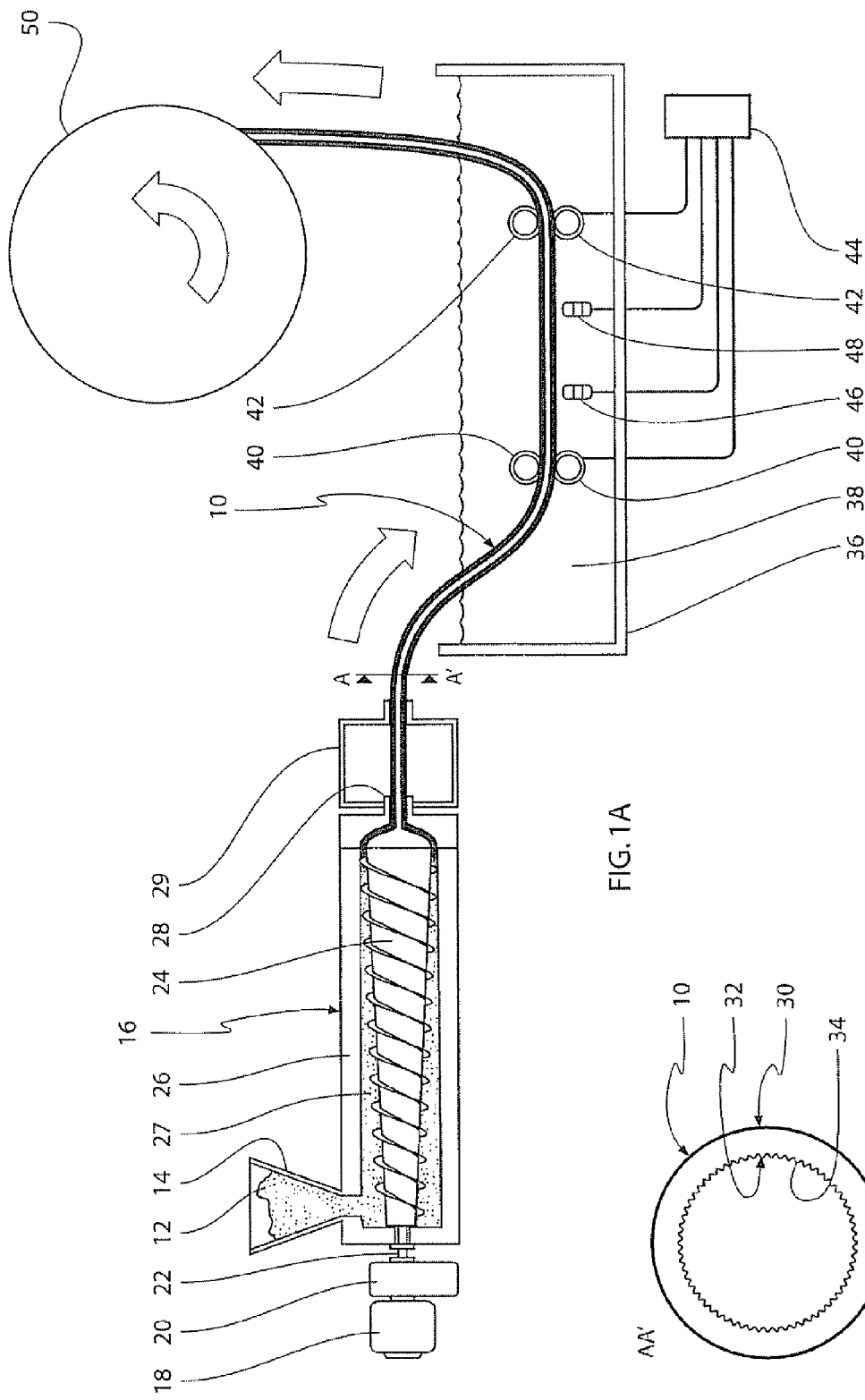
FIG. 1A illustrates a presently preferred process for producing a guide tube.
Figure 1B:
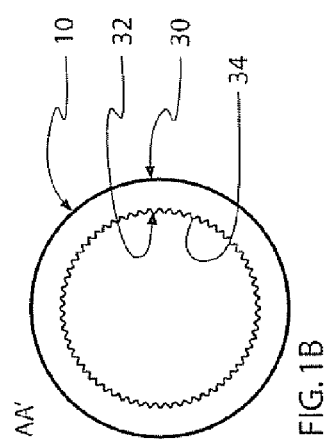
FIG. 1B is a cross-sectional view of a presently preferred guide tube.

FIG. 1A illustrates a presently preferred process for producing a guide tube 10. A first base material 12 in the form of high-density polyethylene grains is introduced through a first inlet 14 of a first extruder 16. The first extruder 16 comprises a motor 18 coupled via a gear 20 and an axle 22 to a screw conveyer 24 within a heating chamber 26. The first base material 12 is led from the first inlet 14 into the heating chamber 26 where it melts to form a mass 27. The motor 18 drives the screw conveyor 24 to convey the mass 27 towards a die 28 and press the mass 27 through the die 28 to form the guide tube 10 seamlessly. The guide tube 10 enters a vacuum calibrator 29 in which it is subjected to a pressure being lower than the ambient pressure. A change of the pressure inside the vacuum calibrator 29 influences the outer diameter of the guide tube 10. The outer diameter increases if the pressure is decreased, and the outer diameter decreases if the pressure is increased. The pressure inside the vacuum calibrator 29 is regulated so that the guide tube 10 defines a constant outer diameter. A cross-sectional cut of the guide tube 10 as indicated by the line AA' in FIG. 1A is shown in FIG. 1B. The guide tube 10 has a smooth outer surface 30 that is circular cylindrical and an inner surface 32 that is circular cylindrical and undulating to define longitudinal tracks 34 for reducing the friction when inserting optical fibre cables into the guide tube 10.

The guide tube 10 is led from the extruder 16 into an open tank 36 containing water 38. The guide tube 10 is submerged over a certain length in the water 38, over which length it gradually cools. A first pair of cooperating rollers 40 and second pair of cooperating rollers 42 engage the guide tube under the water 38. The rotational speed of the first and second pairs of cooperating rollers 40 42 is controlled by a control unit 44. A first sensor 46 and a second sensor 48 measure the outer diameter of the guide tube 10 at their respective locations and send the information to the control unit 44. The control unit adjusts the rotational speed of the first and second pairs of cooperating rollers 40 42 so that the guide tube 10 is compressed or elongated to attain the desired inner and outer diameters of approximately 15 mm and approximately 20 mm, respectively, after passing the second pair of cooperating rollers. The guide tube 10 is subsequently wound up on a storage cable drum 50. The arrows in FIG. 1A indicate the direction of travel of the extruded guide tube 10 and the direction of rotation of the storage cable drum 50.

Figure 2A:
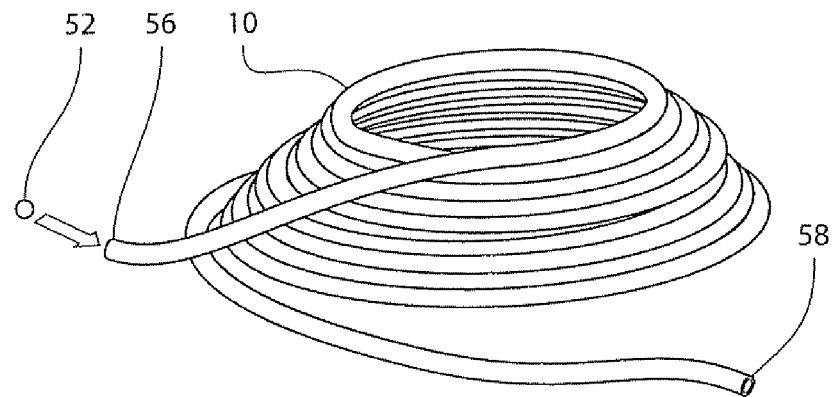
FIGS. 2A-B illustrate a method for ensuring a minimum internal transverse dimension of a guide tube.
Figure 2B:
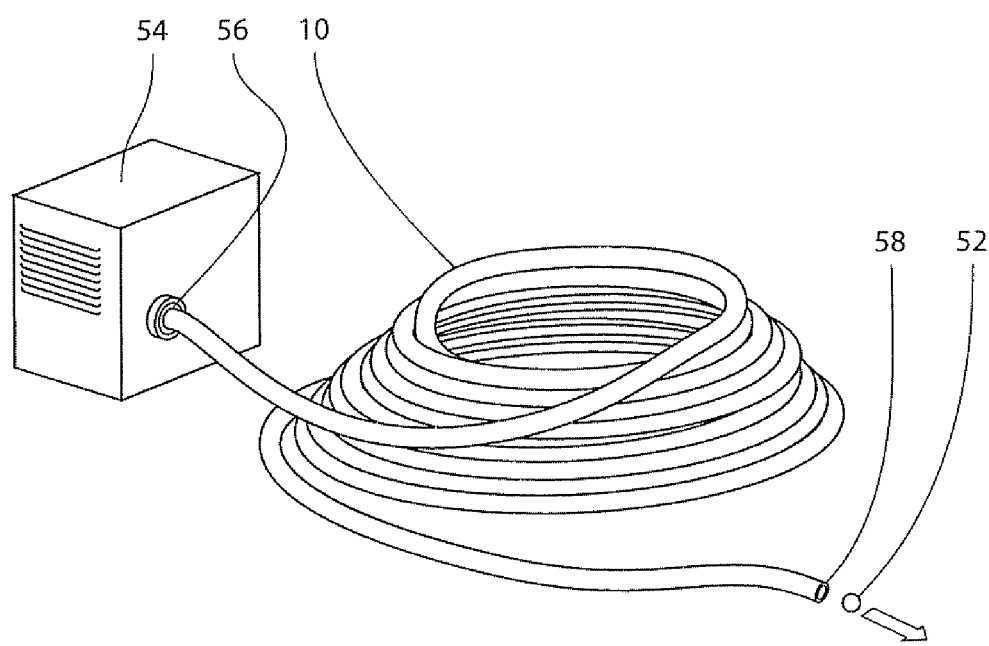

FIGS. 2A-B illustrate a method for ensuring that the guide tube 10 has an inner diameter that is equal to or greater than a certain value. A ball 52 is inserted through an inlet end 56 of the guide tube 10. The inlet end 56 is coupled to a compressor 54. The compressor 54 generates a pressure higher than the ambient pressure and pushes the ball 56 through the guide tube and out through the outlet end 58 provided its diameter is smaller than smallest transverse inner dimension of the guide tube 10 over the complete length of the guide tube 10. In FIGS. 2A-B the guide tube 10 is shown in a partly unwound state positioned on a horizontal surface. However, the method described here would also work for a guide tube 10 in a wound state on a cable drum, or in an unwound state tracing a straight line.

FIG. 3A illustrates a presently preferred method of manufacturing an assembly for guiding and protecting optical fibre cables, two first cable drums 62-64 are provided, each carrying a first guide tube 72-74, and two second cable drums 66-68 are provided, each carrying a second guide tube 76-78. The guide tubes 72-78 have been manufactured according to the method described in relation to FIGS. 1A-B. The two first guide tubes 72-74 are retrieved from their respective first cable drum 62-64 and brought into parallel and coplanar relationship by a pair of first position and orientation rollers 80. The two second guide tubes 76-78 are retrieved from their respective second cable drum 66-68 and brought into parallel and coplanar relationship by a pair of second position and orientation rollers 82. The first and second guide tubes 72-78 are also brought into parallel and coplanar relationship by the first and second position and orientation rollers 80-82. The resulting relative positioning is illustrated in FIG. 3B corresponding to the cut indicated by AA' in FIG. 3A.

The first and second guide tubes 72-78 are led into a second extruder 84 and exit the second extruder 84 through a second die 94. A second base material 86 in the form of low-density polyethylene grains is introduced through a second inlet 88. The second extruder is operated by a second motor 90 connecting the second extruder 84 via a second gear 92. When the guide tubes 72-78 exit the second die 94, a first tubular shell 106 is created around the first guide tubes 72-74, a second tubular shell 108 is created around the second guide tubes 76-78, and a first connecting strip 110 is created interconnecting the first and second tubular shells 106-108. The first and second tubular shells 106-108 and the first connecting strip 110 have approximately the same uniform thickness. The resulting assembly 104 is led into a second open container 96 containing water 98 by a pair of cooperating submerging rollers 100. The assembly 104 cools when submerged and is subsequently led from the water 98 by a pair of surfacing rollers 102 to an assembly cable drum 105. The shape of the assembly 104 is fixed when it cools in the second open container 96 and a cross-sectional cut of the resulting assembly 104 is shown in FIG. 3C corresponding to the cut indicated by BB' in FIG. 3A. The temperature of the first and second guide tubes 72-78 is controlled so that an interference fitting is established between the first and second guide tubes 72-78 and the first and second tubular shells 106-108 in the resulting assembly 104. For example, if the transverse thermal expansion of the first and second guide tubes 72-78 is approximately the same as for the first and second tubular shells 106-108, but the initial temperature of the first and second guide tubes 72-78 is higher than the temperature of the extruded first and second tubular shells 106-108, then the resulting interference fitting may be poor or not established. This scenario is avoided by keeping the initial temperature of the first and second guide tubes 72-78 lower than the temperature of the extruded first and second tubular shells 106-108.

FIG. 4A illustrates a method corresponding to the method described in relation to FIGS. 3A-C and further including a pair of elongated strength elements 116-118 in the resulting assembly 104'. The pair of elongated strength elements 116-118 is in the form of aramid fibre wires that are individually led from a pair of strength element spools 112-114 and positioned in a coplanar and parallel relationship with the first and second guide tubes 72-78 by two pairs of cooperating strength element position and orientation rollers 120-122. The resulting positioning and orientation is shown in the cross-sectional view of FIG. 4B corresponding to the cut indicated by AA' in FIG. 4A. The pair of elongated strength elements 116-118 is led into the second extruder 84 and is embedded in the connecting strip 110 when exiting the second extruder 84 through the second die 94'. A cross-sectional cut of the resulting assembly 104' is shown in FIG. 4C corresponding to the cut indicated by BB' in FIG. 4A.

FIG. 5A illustrates a method corresponding to the method described in relation to FIGS. 3A-C and further including strength wire in the resulting assembly 104". The strength wire 124 is the form of a multi-stranded steel wire and is led from a strength wire cable drum 126 and positioned in a coplanar and parallel relationship with the first and second guide tubes 72-78 a pair of cooperating strength wire position and orientation rollers 127. The resulting positioning and orientation is shown in the cross-sectional view of FIG. 5B corresponding to the cut indicated by AA' in FIG. 5A. The strength wire 124 is led into the second extruder 84 and a third tubular shell 128 enclosing the strength wire 124 and a second connecting strip 130 coplanar with the first connecting strip 110 are generated when exiting the second extruder 84 through the second die 94". A cross-sectional cut of the resulting assembly 104" is shown in FIG. 4C corresponding to the cut indicated by BB' in FIG. 4A.

FIG. 6A illustrates a method corresponding to the combined methods described in relation to FIGS. 4A-C and FIGS. 5A-C resulting in an assembly 104''' including both a pair of strength elements 116-118 and a strength wire 124 when exiting the die 94''' of the second extruder 84.

FIG. 7A illustrates a method of manufacturing an assembly for guiding and protecting optical fibre cables. Two first cable drums 62-64 are provided, each carrying a first guide tube 72-74, and two second cable drums 66-68 are provided, each carrying a second guide tube 76-78. The guide tubes 72-78 have been manufactured according to the method described in relation to FIGS. 1A-B. The two first guide tubes 72-74 are retrieved from their respective first cable drum 62-64 and brought into parallel and coplanar relationship by a pair of first position and orientation rollers 80. The two second guide tubes 76-78 are retrieved from their respective second cable drum 66-68 and brought into parallel and coplanar relationship by a pair of second position and orientation rollers 82. The first and second guide tubes 72-74 are also brought into parallel and coplanar relationship by the first and second position and orientation rollers 80-82. The resulting relative positioning is illustrated in FIG. 7B corresponding to the cut indicated by AA' in FIG. 7A.

The first and second guide tubes 72-78 are led into a second extruder 84 and exits the second extruder 84 through a second die 216. A second base material 86 in the form of low-density polyethylene grains is introduced through a second inlet 88. The second extruder 84 is operated by a second motor 90 connecting the second extruder 84 via a second gear 92. When the guide tubes 72-78 exit the second die 216, an elongated tubular shell 186 is created around the first guide tubes 72-74 and second guide tubes 76-78. The cross-sectional cut of the extruded assembly 182 indicated by BB' is shown in FIG. 7C. The hot and deformable elongated tubular shell 186 is engaged between the first guide tubes 72-74 and second guide tubes 76-78 by a pair of counter-rotating and cooperating discs 180 so that the elongated tubular shell 186 is deformed and fused together in an elongated notch 188. The cross-sectional cut of the resulting assembly 184 indicated by CC' is shown in FIG. 7D.

The assembly 184 is led into a second open container 96 containing water 98 by a pair of cooperating submerging rollers 100. The assembly 184 cools when submerged and is subsequently led from the water 98 by a pair of surfacing rollers 102 to an assembly cable drum 105. The shape of the assembly 184 is fixed when it cools in the second open container 96 and a cross-sectional cut of the resulting assembly 184 is shown in FIG. 7D corresponding to the cut indicated by CC'. The temperature of the first and second guide tubes 72-78 is controlled so that an interference fitting is established between the first and second guide tubes 72-78 and the elongated tubular shell 186 in the resulting assembly 184. For example, if the transverse thermal expansion of the first and second guide tubes 72-78 is approximately the same as for the elongated tubular shell 186, but the initial temperature of the first and second guide tubes 72-78 is higher than the temperature of the extruded elongated tubular shell 186, then the resulting interference fitting may be poor or not established. This scenario is avoided by keeping the initial temperature of the first and second guide tubes 72-78 lower than the temperature of the extruded elongated tubular shell 186.

FIG. 8A illustrates a method of manufacturing an assembly for guiding and protecting optical fibre cables. Two first cable drums 62-64 are provided, each carrying a first guide tube 72-74, and two second cable drums 66-68 are provided, each carrying a second guide tube 76-78. The guide tubes 72-78 have been manufactured according to the method described in relation to FIGS. 1A-B. An elongated spacer 192 composed of a spacer body 194 of high-density polyethylene extruded around an elongated strength element 196 in the form of an aramid fibre wire is wound on a spacer drum 190. The elongated spacer 192 has a symmetrical cross-section with the elongated strength element 196 at its centre, a first outer surface 200, a second outer surface 202 on the opposite side of the spacer 192 from the first outer surface 200, a first concave surface 204 between the first outer surface 200 and the second outer surface 202, and a second concave surface 206 between the first outer surface 200 and the second outer surface 202 and on the opposite side of the elongated spacer 192 from the first concave surface 204. The two first guide tubes 72-74 are retrieved from their respective first cable drum 62-64 and brought into parallel and coplanar relationship by a pair of first position and orientation rollers 80. The two second guide tubes 76-78 are retrieved from their respective second cable drum 66-68 and brought into parallel and coplanar relationship by a pair of second position and orientation rollers 82. The first and second guide tubes 72-74 are also brought into parallel and coplanar relationship by the first and second position and orientation rollers 80-82. The elongated spacer 192 is retrieved from the spacer drum 190 and positioned and oriented so that the first concave surface faces the closest first guide tube 74 and the second concave surface faces the closest second guide tube 76 by mutually cooperating spacer and position and orientation rollers 198. The elongated spacer 192 and the first and second guide tubes 72-74 are in a parallel and coplanar relationship following their respective orientating and positioning. The resulting relative positioning is illustrated in FIG. 8B corresponding to the cut indicated by AA' in FIG. 8A.

The first and second guide tubes 72-78 and the elongated spacer 192 are led into a second extruder 84 and exits the second extruder 84 through a second die 216'. A second base material 86 in the form of low-density polyethylene grains is introduced through a second inlet 88. The second extruder 84 is operated by a second motor 90 connecting the second extruder 84 via a second gear 92. When the guide tubes 72-78 exit the second die 216, an elongated tubular shell 186' is created around the first guide tubes 72-74 and second guide tubes 76-78. The cross-sectional cut of the extruded assembly 182' indicated by BB' is shown in FIG. 8C. The hot and deformable elongated tubular shell 186' is engaged by a pair of counter-rotating and cooperating rollers 183 so that the elongated tubular shell 186' is pressed against the first outer surface 200 and the second outer surface 202 and fuses to the elongated spacer 192. The deforming of the elongated tubular shell 186' causes the first guide tubes 72, 74 the elongated spacer 192, and the second guide tubes 76-78 to be pressed together. The cross-sectional cut of the resulting assembly 184' indicated by CC' is shown in FIG. 8D.

The assembly 184' is led into a second open container 96 containing water 98 by a pair of cooperating submerging rollers 100. The assembly 184' cools when submerged and is subsequently led from the water 98 by a pair of surfacing rollers 102 to an assembly cable drum 105. The shape of the assembly 184' is fixed when it cools in the second open container 96 and a cross-sectional cut of the resulting assembly 184' is shown in FIG. 7D corresponding to the cut indicated by CC'. The temperature of the first and second guide tubes 72-78 is controlled so that an interference fitting is established between the first and second guide tubes 72-78, the elongated spacer 192, and the elongated tubular shell 186' in the resulting assembly 184'. For example, if the transverse thermal expansion of the first and second guide tubes 72-78 is approximately the same as for the elongated tubular shell 186', but the initial temperature of the first and second guide tubes 72-78 is higher than the temperature of the extruded elongated tubular shell 186', then the resulting interference fitting may be poor or not established. This scenario is avoided by keeping the initial temperature of the first and second guide tubes 72-78 lower than the temperature of the extruded elongated tubular shell 186'.

Figure 9A:
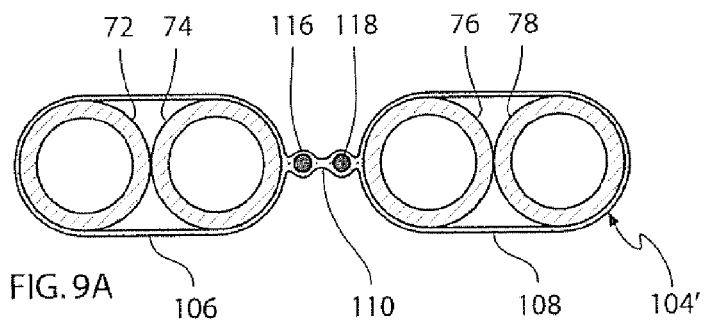
FIGS. 9A-J are cross-sectional views of exemplary assemblies for guiding and protecting optical fibre cables according to the present invention.

FIG. 9A illustrates a cross-sectional cut of the assembly 104' described in relation to FIGS. 4A-C.

Figure 9B:
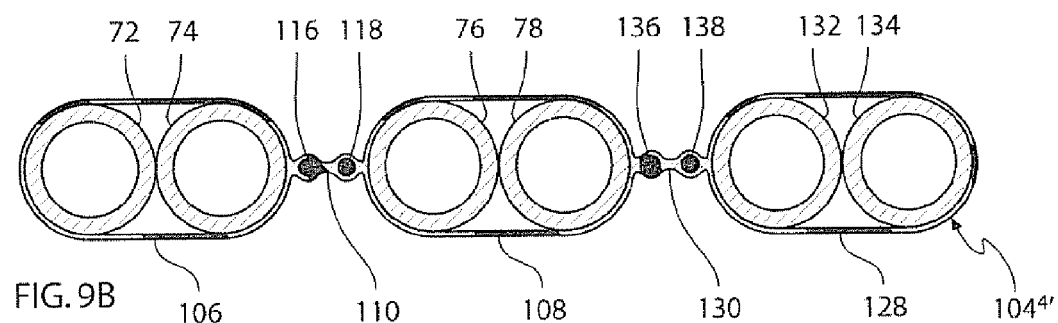

FIG. 9B illustrates a cross-sectional cut of an exemplary assembly $104^{4'}$ having the features of the assembly 104' described in relation to FIG. 9A and further comprising a pair of third guide tubes 132-134 enclosed by an elongated third tubular shell 128 connected to the second tubular shell 108 by a second connecting strip 130. A pair of elongated third strength elements 136-138 in the form of aramid fibre wires is embedded in the second connecting strip 130. The first, second, and third guide tubes 72-78, 132-134 have the same dimensions, and the strength elements 116-118 and the third strength elements 136-138 are of the same type. The first and second connecting strips 110 130 and the central axes of the first, second, and third guide tubes 72-78, 132-134 are co-planar.

Figure 9C:
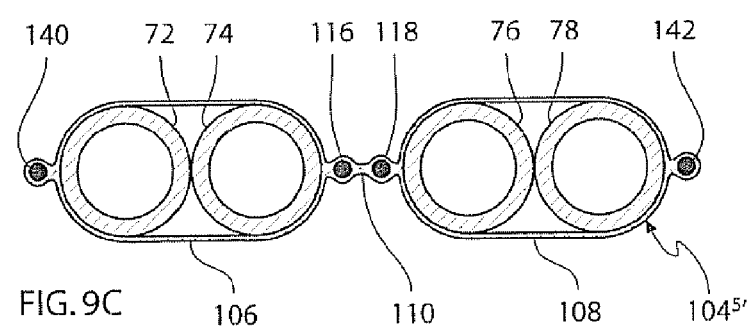

FIG. 9C illustrates a cross-sectional cut of an exemplary assembly $104^{5'}$ having the features of the assembly 104' described in relation to FIG. 9A and further comprising a pair of auxiliary strength elements 140-142 in the form of aramid fibre wires. One auxiliary strength element 140 is embedded in the first tubular shell 106 and the other auxiliary strength element is embedded in the second tubular shell 108. The auxiliary strength elements 140-142 are coplanar with the auxiliary strength elements 116-118.

Figure 9D:
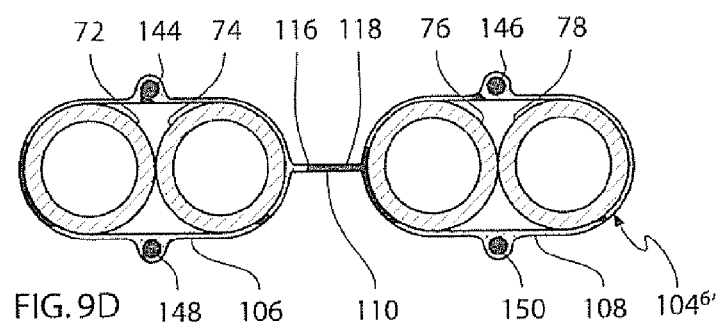

FIG. 9D illustrates a cross-sectional cut of an exemplary assembly $104^{6'}$ corresponding to the assembly 104 described in relation to FIGS. 3A-C and further comprising four auxiliary strength elements 144-150 in the form of aramid fibre cables. The auxiliary strength elements are parallel to the first and second guide tubes 72-78. One auxiliary strength element 144 is embedded in and at the middle top portion of the first tubular shell 106, one auxiliary strength element 146 is embedded in and at the middle top portion of the second tubular shell 108, one auxiliary strength element 148 is embedded in and at the middle bottom portion of the first tubular shell 106, and one auxiliary strength element 150 is embedded in and at the middle bottom portion of the second tubular shell 108.

Figure 9E:
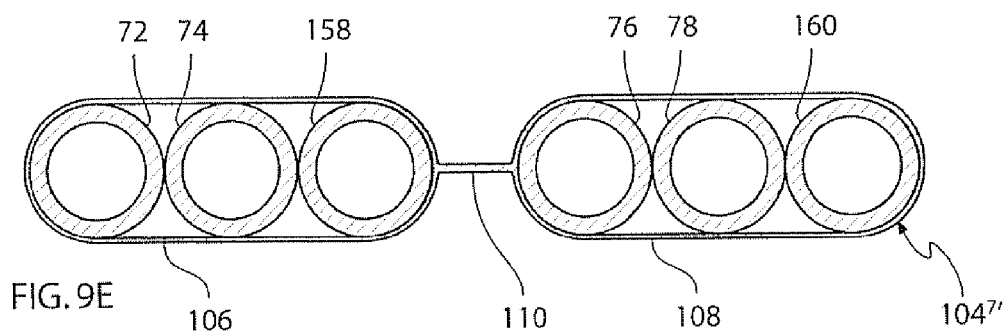

FIG. 9E illustrates a cross-sectional cut of an exemplary assembly $104^{7'}$ corresponding to the assembly 104 described in relation to FIGS. 3A-C and further comprising another first guide tube 158 enclosed by the first tubular shell 106 and in coplanar relationship with the other two first guide tubes 72-74, and another second guide tube 160 enclosed by the second tubular shell 108 and in coplanar relationship with the other two second guide tubes 76-78. All of the first and second guide tubes 72-78 158-160 have the same dimensions.

Figure 9F:
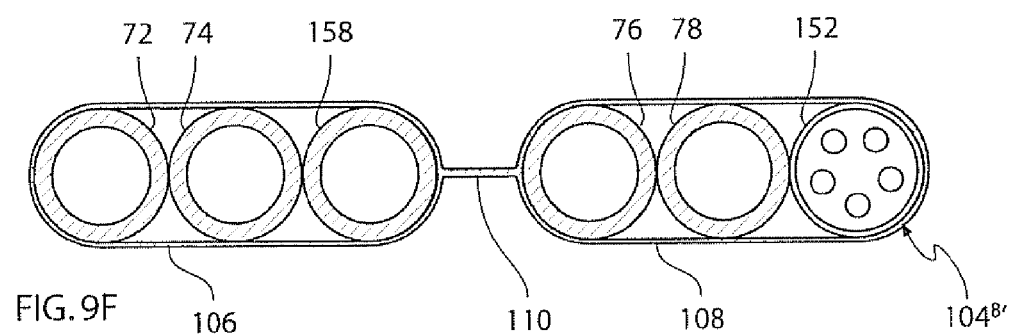

FIG. 9F illustrates a cross-sectional cut of an exemplary assembly $104^{8'}$ corresponding to the assembly 104 described in relation to FIGS. 3A-C and further comprising another first guide tube 158 enclosed by the first tubular shell 106 and in coplanar relationship with the other two first guide tubes 72-74, and a three phase electrical power cable 152 enclosed by the second tubular shell 108 and in coplanar relationship with the other two second guide tubes 76-78. The first and second guide tubes 72-78 158 and the three phase electrical power cable 152 all have the same outer dimensions. The three phase electrical power cable 152 has five internal conduits, three for live phases, one for neutral, and one for ground.

Figure 9G:
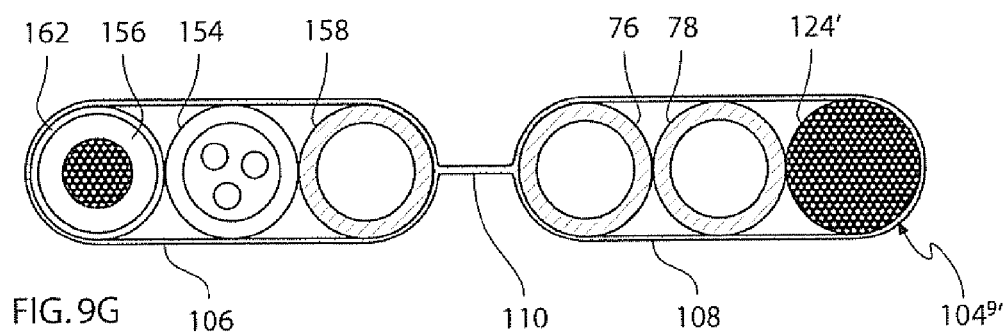

FIG. 9G illustrates a cross-sectional cut of an exemplary assembly $104^{9'}$ corresponding to the assembly 104 described in relation to FIGS. 3A-C and further comprising a strength wire 124' in the form of a multi-stranded steel wire enclosed by the second tubular shell 108 and in coplanar relationship with the two second guide tubes 76-78. The strength wire 124' has the same outer diameter as the second guide tubes 76-78. The assembly $104^{9'}$ further comprises a three phase electrical power cable 154 and an electrical telecommunication cable 156 enclosed by the first tubular shell 106 replacing the pair of first guide tubes of the assembly 104 disclosed in relation to FIGS. 3A-C. The assembly $104^{9'}$ further comprises another first guide tube 158 enclosed by the first tubular shell 106 and in coplanar relationship with the three phase electrical power cable 154 and the electrical telecommunication cable 156. A co-planar relationship is also defined between the objects enclosed by the first and the second tubular shells 106-108 and the connecting strip 110. The three phase electrical power cable 154 has the same outer diameter as the first guide tube 158. The electrical telecommunication cable 156 as such has a smaller outer diameter than the first guide tube 158 but has been provided with a tubular filler sheet 162 providing the same outer diameter as first guide tube 158. The tubular filler sheet 162 has been extruded around the filler using the same material as in the guide tubes 76-78 in the extrusion process.

Figure 9H:
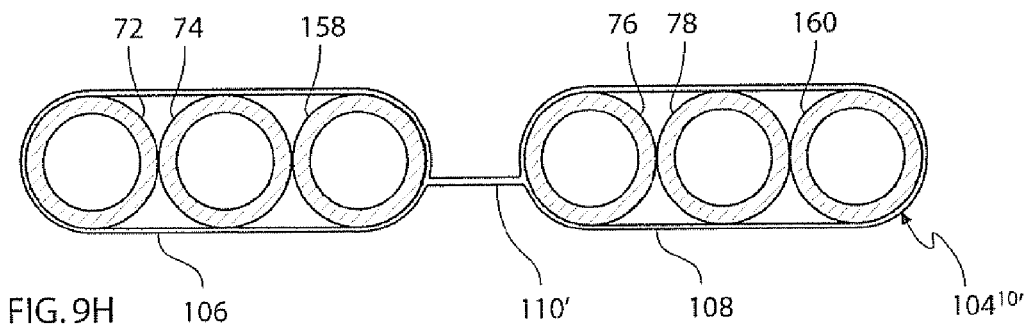
Figure 9I:
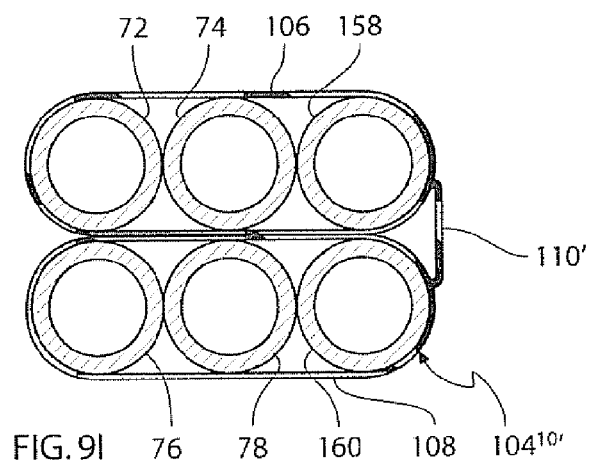

FIG. 9H illustrates a cross-sectional cut of an exemplary assembly $104^{10'}$ corresponding to the assembly $104^{7'}$ described in relation to FIG. 9E but with the connecting strip 110' at a different position relative to the first guide tubes 72-74, 158 and the second guide tubes 76-78, 160. The central axis of the first guide tubes 72-74, 158 and the second guide tubes 76-78, 160 are in a common plane and the connecting strip is parallel to the common plane and defines a separation to the common plane that is approximately one sixth of the outer diameter of the first and second guide tubes 72-78, 158-160. The connecting strip 110' is flexible and its width is approximately two thirds of the diameter of the first and second guide tubes 72-78, 158-160. This allows the assembly 104$^{10'}$ to be folded along the connecting strip 110' so that the first tubular shell 106 engages the second tubular shell 108 facially, as is shown in FIG. 9I.

Figure 9J:
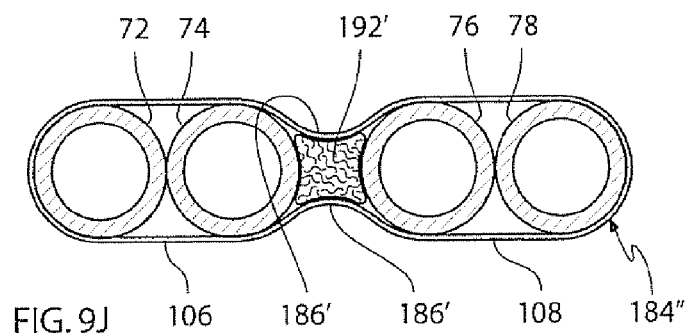

FIG. 9J illustrates a cross-sectional cut of an exemplary assembly 184" corresponding to the assembly 184' described in relation to FIGS. 8A-D, but without a strength element inside the elongated spacer 192'. Instead, the spacer body is made of an extruded fibre reinforced material. The extruded fibre reinforced material is a high-density polyethylene with aramid fibres distributed evenly in the material and oriented in the general longitudinal direction of the elongated spacer. The aramid fibres have the effect that the longitudinal thermal expansion of the elongated spacer 192' is reduced, consequently, the longitudinal thermal expansion of the assembly 184" is reduced.

Figure 10A:
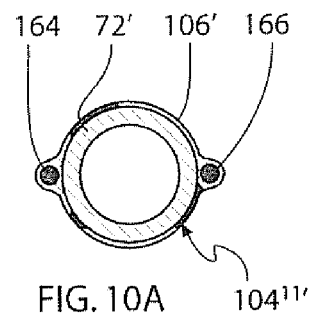
FIGS. 10A-B are cross-sectional views of exemplary assemblies for guiding and protecting optical fibre cables according to the present invention.

FIG. 10A illustrates a cross-sectional cut of an exemplary assembly 104$^{11'}$ having a single first guide tube 72' that is enclosed by and in parallel relationship with a first tubular shell 106'. The first tubular shell 106' establishes an interference fitting between the first guide tube 72' and the first tubular shell 106'. The first guide tube 72' is manufactured of high-density polyethylene and the first tubular shell 72' is manufactured of low-density polyethylene. Two elongated strength elements 164-166 in the form of aramid fibre wires define a parallel relationship with the first guide tube 72' and are embedded in the first tubular shell 106'. The central axis of the first guide tube 72' and the elongated strength elements 164-166 are in a common plane.

Figure 10B:
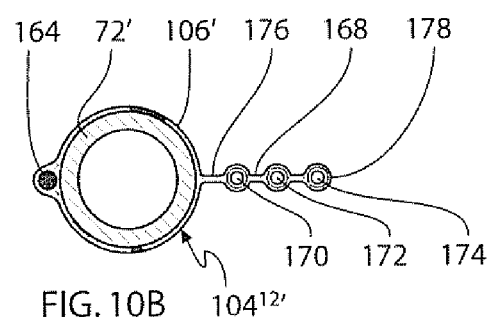

FIG. 10B illustrates a cross-sectional cut of an exemplary assembly 104$^{12'}$ corresponding to the assembly 104$^{11'}$ described in relation to FIG. 10A but with one of the strength elements 166 replaced by an outer strip 168 having two opposing sides 176-178 defining a uniform width of the outer strip 168 throughout its length. The outer strip 168 is connected to the first tubular along one of its sides 176. Three electrical cables 170-174 are embedded within the outer strip 168. The outer strip 168 and the first tubular shell orient the electrical cables 170-174 and the strength element 164 in a parallel relationship in a common plane.

The methods of manufacturing described in relation to FIG. 3A, FIG. 4A, and FIG. 5A may be modified to manufacture the exemplary assemblies described in relation to FIGS. 10A-B by reducing the number of inputs, e.g. the number of guide tubes, and rearranging the relative positions of the inputs, e.g. the position of the strength elements relative to the guide tubes, before entering the second extruder 84. Further, additional inputs in the second extruder 84 may be introduced, e.g. the three electrical cables 170-174. The second die is adapted to produce a tubular shell 106' and an outer strip 168 as is shown in FIGS. 10A-B.

Figure 11:
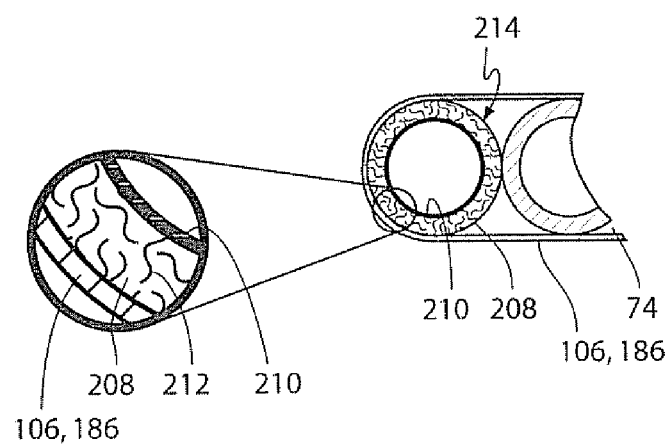
FIG. 11 is a cross-sectional view of a fibre reinforced guide tube.

FIG. 11 illustrates a cross-sectional cut of an exemplary assembly, which may be manufactured by any of the methods described in relation to FIG. 3A, FIG. 4A, FIG. 5A, FIG. 6A, FIG. 7A, or FIG. 8A. The outer guide tube 72 of the first guide tubes 72-76 has been replaced with a reinforced guide tube 214 having approximately the same outer diameter as the first guide tube 74. The reinforced guide tube 214 comprises an outer tube 208 made of an extruded fibre reinforced material and an inner lining 210 made of an extruded non-fibre reinforced material. The extruded fibre reinforced material is a high-density polyethylene with aramid fibres 212 distributed evenly in the material and oriented in the general longitudinal direction of the outer tube 208. The extruded non-fibre reinforced material is a high-density polyethylene. The aramid fibres have the effect that the longitudinal thermal expansion of the fibre reinforced guide tube 214 is reduced; consequently, the longitudinal thermal expansion of the assembly as a whole is reduced. Fibres of the outer tube 208 may cause its surface to be coarse and uneven, which increases the friction when introducing optical fibres. The inner lining 210 of the non-fibre reinforced material prevents the increase in the friction. FIG. 12A illustrates a presently preferred method of manufacturing an assembly for guiding and protecting optical fibre cables. Two first cable drums 62-64 are provided, each carrying a first guide tube 72-74, and two second cable drums 66-68 are provided, each carrying a second guide tube 76-78. The guide tubes 72-78 have been manufactured according to the method described in relation to FIGS. 1A-B. The centre-most first guide tube 74 is lined with a first outer lining 222 and the centre-most second guide tube 76 is lined with a second outer lining 224. The first outer lining 222 and the second outer lining are of low-density polyethylene. A single third cable drum 230 is provided carrying a third guide tube 220. The third guide tube has been manufactured according to the method described in relation to FIGS. 1A-B.

The two first guide tubes 72-74, the two second guide tubes 76-78, and the single third guide tube 220 are retrieved from their respective first cable drum 62-64, second cable drum 76-78, and third cable drum 230 and brought into parallel and coplanar relationship by a roller assembly 240. The resulting relative positioning is illustrated in FIG. 12B corresponding to the cut indicated by AA' in FIG. 12A.

The first and second guide tubes 72-78 and the third guide tube 220 are led into a second extruder 84 and exit the second extruder 84 through a second die 216'. A second base material 86 in the form of low-density polyethylene grains is introduced through a second inlet 88. The second extruder is operated by a second motor 90 connecting the second extruder 84 via a second gear 92. When the guide tubes 72-78, 220 exit the second die 94, an elongated tubular shell 186 is created around the first guide tubes 72-74, the second guide tubes 76-78, and the third guide tube 220. The elongated tubular shell 186 has approximately a uniform thickness and is fused with the first outer lining 222 of the centre-most first guide tube 74 and with the second outer lining 224 of the centre-most second guide tube 76. The resulting assembly 184" is led into a second open container 96 containing water 98 by a pair of cooperating submerging rollers 102. The assembly 184" cools when submerged and is subsequently led from the water 98 by a pair of surfacing rollers 102 to an assembly cable drum 105. The shape of the assembly 184" is fixed when it cools in the second open container 96 and a cross-sectional cut of the resulting assembly 184" is shown in FIG. 12C corresponding to the cut indicated by BB' in FIG. 12A.

The centre-most first guide tube 74 and the centre-most second guide tube 76 are fused to the elongated tubular shell 186. Consequently, these three elements are fixed relative to one another and a transverse flexing of the assembly 184" is prevented. Each of the outermost first guide tube 72, the outermost second guide tube 78, and the third guide tube 220 are engaged by the rest of the extruded assembly 184" in interference fittings.

FIGS. 13A-C illustrate a method similar to the method described in relation to FIGS. 12A-C. All equivalent features have been given the same number indexing. The method differs in that the centre-most first guide tube 74 not lined with a first outer lining and the centre-most second guide tube 76 is not lined with a second outer lining. Instead, the centre-most first guide tube 74 and the centre-most second guide tube 76 are led by the roller assembly 240 into a first surface modifier 232 and second surface modifier 234, respectively. The surface modifiers subject the outer surface of the guide tubes with a plasticiser, thus lowering the melting point of the outermost surface layer 226 of the first guide tube 74 and the outermost surface layer 228 of the second guide tube 76 and making them softer. This has the effect that when the elongated tubular shell 186 is extruded around the guide tubes, it fuses with the surfaces of the centre-most first guide tube 74 and the centre-most second guide tube 76. Consequently, a transverse flexing is prevented as described in relation to FIGS. 12A-C.

EXAMPLE

An assembly was manufactured according to the method described in relation to FIGS. 1A.B, FIGS. 2A-B, and FIGS. 4A-C. The guide tubes had an inner diameter of 16 mm and an outer diameter of 20 mm. The thickness of the tubular shells and the connecting strip was between approximately 0.3 mm and approximately 2 mm. The width of the connecting strip was approximately 15 mm. The aramid fibre wires had a diameter of 2 mm and the distance between the centres of the wires was approximately 8 mm. The assembly was subjected to different ambient temperatures and its longitudinal thermal expansion was determined to be 0.05 mm/m/° C.

The present invention is summarized and further characterized by the points:

1. An assembly for guiding and protecting optical fibre cables or optical wave guides comprising:
   a first number of first guide tubes and
   a second number of second guide tubes,
   each of said first and second guide tubes being adapted for receiving an optical fibre cable along its complete length;
   said assembly further comprising:
   an elongated first tubular shell, and
   an elongated second tubular shell,
   said first number of first guide tubes being supported within and in parallel relationship with said first tubular shell, and said second number of second guide tubes being supported within and in parallel relationship with said second tubular shell; said assembly further comprising:
   a first connecting strip interconnecting said first and second tubular shells, defining a separation between said first and second tubular shells, and positioning said first number of first guide tubes and said second number of second guide tubes in parallel,
   said first and second tubular shells and said first connecting strip originating from a single extrusion process establishing an interference fitting between said first and second guide tubes and said first and second tubular shells, respectively.

2. The assembly according to point 1 characterized by said first connecting strip positioning said first and second guide tubes in a common plane.

3. The assembly according to any of the points 1-2 characterized by each of said first number of first guide tubes and said second number of second guide tubes being circular cylinders with approximately the same outer diameter and defining a central axis, and said central axes of said first and second guide tubes and said first connecting strip being in a common plane.

4. The assembly according to any of the points 1-3 characterized by all guide tubes of said first and second guide tubes having approximately the same longitudinal thermal expansion.

5. The assembly according to any of the points 1-4 characterized by the longitudinal thermal expansion of said first and second guide tubes being approximately equal to or smaller than the longitudinal thermal expansion of said first and second tubular shells.

6. The assembly according to any of the points 1-5 characterized by further comprising:
   a third number of elongated strength elements in parallel relationship with said first and second guide tubes and embedded in said first connecting strip, and the longitudinal thermal expansion of said third number of strength elements being smaller than the longitudinal thermal expansion of said first and second guide tubes.

7. The assembly according to point 6 characterized by said third number of elongated strength elements comprising aramid fibres.

8. The assembly according to any of the points 1-7 characterized by further comprising:
   an electrical power cable, and
   said electrical power cable being supported within and in parallel relationship with said first tubular shell.

9. The assembly according to any of the points 1-8 characterized by further comprising:
   a single-stranded or multi-stranded metal strength wire,
   an elongated third tubular shell, and
   said strength wire being supported within and in parallel relationship with said third tubular shell; said assembly further comprising:
   a second connecting strip interconnecting said first and third tubular shells and defining a separation between said first and second tubular shells, or
   a second connecting strip interconnecting said second and third tubular shells and defining a separation between said second and third tubular shells,
   said second connecting strip positioning said strength wire in parallel relationship with said first number of first guide tubes and said second number of second guide tubes in parallel, and said third tubular shell and said second connecting strip originating from said single extrusion process.

10. A method for manufacturing an assembly for guiding and protecting optical fibre cables or wave guides comprising:
    providing a first number of first guide tubes and a second number of second guide tubes, each of said first and second guide tubes being adapted for receiving an optical fibre cable along its complete length,
    orienting said first number of first guide tubes and said second number of second guide tubes in parallel, and
    extruding in a single extrusion process an elongated first tubular shell around said first number of first guide tubes, an elongated second tubular shell around said second number of second guide tubes, and a first connecting strip in parallel relationship with said first and second guide tubes and interconnecting said first and second tubular shells for defining a fixed separation between said first and second tubular shells, said single extrusion process further establishing an interference fitting between said first and second guide tubes and said first and second tubular shells, respectively.

11. The method according to point 10 characterized by further comprising:
    controlling the temperature of said first and second guide tubes prior to said single extrusion process for preventing a transverse contracting of said first and second guide tubes that is greater than the transverse contracting of said first and second tubular shells in said single extrusion process.

12. The method according to any of the points 10-11 characterized by further comprising:
   positioning said first number of first guide tubes and said second number of second guide tubes in a common plane.
13. The method according to any of the points 10-12 characterized by further comprising:
   providing a third number of elongated strength elements and the longitudinal thermal expansion of said third number of strength elements being smaller than the longitudinal thermal expansion of said first and second guide tubes,
   orienting said third number of strength elements in parallel relationship with said first and second guide tubes, and
   embedding said third number of strength elements in said first connecting strip in said single extrusion process.
14. The method according to any of the points 10-13 characterized by further comprising:
   providing an electrical power cable,
   orienting said electrical power cable in parallel relationship with said first tubular shell, and
   extruding said elongated first tubular shell around said electrical power cable in said single extrusion process.
15. The method according to any of the points 10-14 characterized by further comprising:
   providing a single-stranded or multi-stranded metal strength wire,
   orienting said strength wire in parallel with said first number of first guide tubes and said second number of second guide tubes, and
   extruding in said single extrusion process an elongated third tubular shell around said strength wire, and a second connecting strip interconnecting said first and third tubular shells and defining a separation between said first and second tubular shells, or a second connecting strip interconnecting said second and third tubular shells and defining a separation between said second and third tubular shells.
16. An assembly for guiding and protecting optical fibre cables or wave guides comprising:
   a first guide tube adapted for receiving an optical fibre cable along its complete length; said assembly further comprising:
   an elongated first tubular shell
   said first guide tubes being supported within and in parallel relationship with said first tubular shell, and said first tubular shell originating from a single extrusion process establishing an interference fitting between said first guide tube and said first tubular shell, and
   a first number of elongated strength elements in parallel relationship with said first guide tube and embedded in said first tubular shell, and the longitudinal thermal expansion of said first number of strength elements being smaller than the longitudinal thermal expansion of said first guide tube.
17. A method for manufacturing an assembly for guiding and protecting optical fibre cables or optical wave guides comprising:
   providing a first guide tube, said first guide tube being adapted for receiving an optical fibre cable along its complete length, and
   extruding in a single extrusion process an elongated first tubular shell around said first guide tube, said single extrusion process further establishing an interference fitting between said first guide tube and said first tubular shell, said method further comprising:
   providing a first number of elongated strength elements, the longitudinal thermal expansion of said first number of strength elements being smaller than the longitudinal thermal expansion of said first guide tube,
   orienting said first number of strength elements in parallel relationship with said first guide tube, and
   embedding said first number of strength elements in said first tubular shell in said single extrusion process.

ITEM LIST 10 guide tube
12 first base material
14 first inlet
16 first extruder
18 motor
20 gear
22 axle
24 screw conveyer
26 heating chamber
27 mass
28 die
29 vacuum calibrator
30 outer surface
32 inner surface
34 longitudinal tracks
36 open tank
38 water
40 first pair of cooperating rollers
42 second pair of cooperating rollers
44 control unit
46 first sensor
48 second sensor
50 cable drum
52 ball
54 compressor
56 inlet end
58 outlet end
62 first cable drum
64 first cable drum
66 second cable drum
68 second cable drum
72 first guide tube
74 first guide tube
76 second guide tube
78 second guide tube
80 first position and orientation rollers
82 second position and orientation rollers
84 second extruder
86 second base material
88 second inlet
90 second motor
92 second gear
94 second die
96 second open container
98 water
100 submerging rollers
102 surfacing rollers
104 assembly
105 assembly cable drum
106 first tubular shell
108 second tubular shell
110 first connecting strip
112 strength element spool
114 strength element spool
116 strength element
118 strength element 120 strength element position and orientation rollers
122 strength element position and orientation rollers
124 strength wire
126 strength wire cable drum
127 strength wire position and orientation rollers
128 third tubular shell
130 second connecting strip
132 third guide tube
134 third guide tube
136 third strength element
138 third strength element
140 auxiliary strength element
142 auxiliary strength element
144 auxiliary strength element
146 auxiliary strength element
148 auxiliary strength element
150 auxiliary strength element
152 three phase electrical power cable
154 three phase electrical power cable
156 electrical telecommunication cable
158 first guide tube
160 second guide tube
162 filler sheet
164 strength element
166 strength element
168 outer strip
170 electrical cable
172 electrical cable
174 electrical cable
176 first side
178 second side
180 counter-rotating discs
182 extruded assembly
183 counter rotating rollers
184 assembly
186 elongated tubular shell
188 elongated notch
190 spacer drum
192 elongated spacer
194 spacer body
196 strength element
198 spacer position and orientation rollers
200 first outer surface
202 second outer surface
204 first concave surface
206 second concave surface
208 outer tube
210 inner lining
212 fibre
214 reinforced guide tube
216 second die
220 third guide tube
222 first outer lining
224 second outer lining
226 first outer surface layer
228 second outer surface layer
230 third cable drum
232 first surface modifier
234 second surface modifier
240 roller assembly

The invention claimed is:
1. An assembly for guiding and protecting optical fibre cables or optical wave guides, comprising:
a first plurality of first guide tubes and a second plurality of second guide tubes, each of said first and second guide tubes being adapted for receiving an optical fibre cable along its complete length, the first and second guide tubes exhibiting a longitudinal thermal expansion;
an elongated first tubular shell and an elongated second tubular shell formed together with an interconnecting connecting strip, said first plurality of first guide tubes being enveloped with an interference fit within said first tubular shell, and said second plurality of second guide tubes being enveloped with an interference fit within said second tubular shell, said first and second tubular shells exhibiting a longitudinal thermal expansion;
said connecting strip defining a separation between said first and second tubular shells and positioning said first plurality of first guide tubes and said second plurality of second guide tubes in parallel; and
a third plurality of elongated strength elements in parallel relationship with said first and second guide tubes and embedded in said connecting strip, the elongated strength elements exhibiting a longitudinal thermal expansion smaller than the longitudinal thermal expansion of said first and second guide tubes.

2. The assembly of claim 1, further comprising:
a fourth plurality of elongated auxiliary strength elements in parallel relationship with at least one of said first guide tubes and said second guide tubes and embedded in at least one of said first tubular shell and said second tubular shell, the elongated auxiliary strength elements exhibiting a longitudinal thermal expansion smaller than the longitudinal thermal expansion of said first guide tubes and said second guide tubes, respectively, and smaller than the thermal expansion of said first tubular shell and said second tubular shell, respectively.

3. The assembly according to claim 1, wherein said connecting strip positions said first and second guide tubes in a common plane.

4. The assembly according to claim 1, wherein each of said first plurality of first guide tubes and said second plurality of second guide tubes is a circular cylinder with approximately the same outer diameter and defines a central axis, and said central axes of said first and second guide tubes and said connecting strip being in a common plane.

5. The assembly according to claim 1, wherein each of said first plurality of first guide tubes and said second plurality of second guide tubes is a circular cylinder with approximately the same outer diameter and defines a central axis, said central axes of said first and second guide tubes being in a common plane, said connecting strip being in parallel relation with said common plane and defining a separation to said common plane that is less than one half of said outer diameter.

6. The assembly according to claim 1, wherein said third plurality of strength elements comprises:
a first strength element and a second strength element, said first strength element defining a first separation distance to said first tubular shell and said second strength element defining a second separation distance to said second tubular shell, said first and second separation distances being approximately equal.

7. The assembly according to claim 1, wherein each of said elongated strength elements comprises aramid fibres.

8. The assembly according to claim 1, wherein said elongated strength elements are under tension so as to exert a longitudinally contracting force on said assembly.

9. The assembly according to claim 2, wherein said first and second guide tubes are positioned in a common plane, and wherein said elongated auxiliary strength elements are positioned in a symmetric pattern relative to said common plane.

10. An assembly for guiding and protecting optical fibre cables or optical wave guides, comprising:
- a first plurality of first guide tubes and a second plurality of second guide tubes, each of said first and second guide tubes being adapted for receiving an optical fibre cable along its complete length, the first guide tubes and the second guide tubes exhibiting a longitudinal thermal expansion; and
- a unitary elongated tubular shell defining first and second parallel tubular shell parts joined to each other along opposite sides of an elongated notch, the first tubular shell part being parallel to and enveloping with an interference fit said first plurality of first guide tubes, and said second tubular shell part being parallel to and enveloping with an interference fit said second plurality of second guide tubes for holding said first and second guide tubes in a fixed relationship relative to one another and for substantially preventing a transverse flexing of said assembly; and
- a third plurality of elongated strength elements in parallel relationship with said first plurality of first guide tubes and embedded in said elongated tubular shell, the elongated strength elements exhibiting a longitudinal thermal expansion of said auxiliary strength elements being smaller than the longitudinal thermal expansion of said first guide tubes and said second guide tubes.

11. The assembly according to claim 10, wherein said first and second guide tubes are positioned in a common plane.

* * * * *